Oct. 5, 1965          E. S. GUTTMANN          3,209,645

NAVIGATIONAL SITUATION DISPLAY WITH CYLINDRICALLY SHAPED FILM

Filed July 18, 1962          12 Sheets-Sheet 1

INVENTOR.
ERICH S. GUTTMANN
BY William T. O'Neil

AGENT

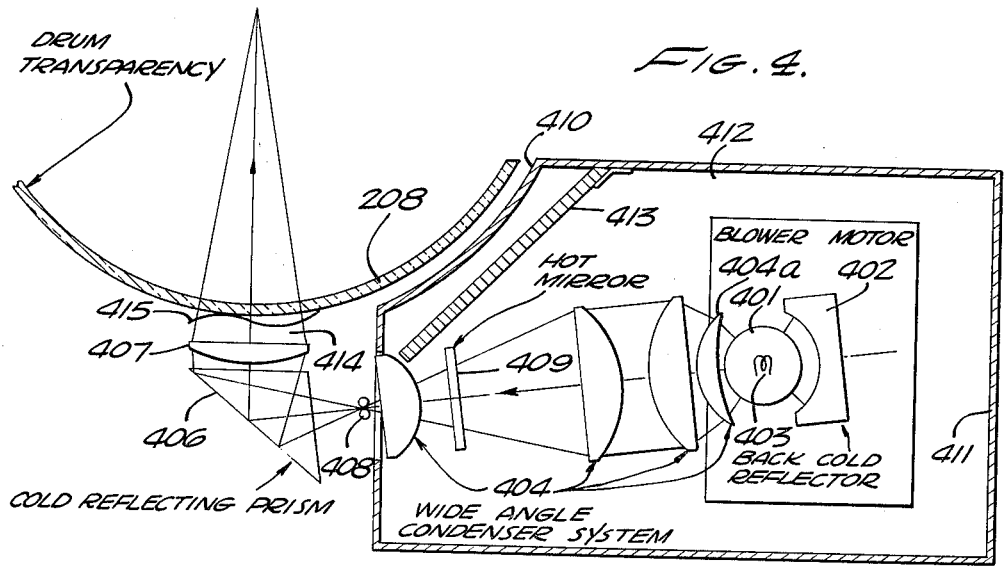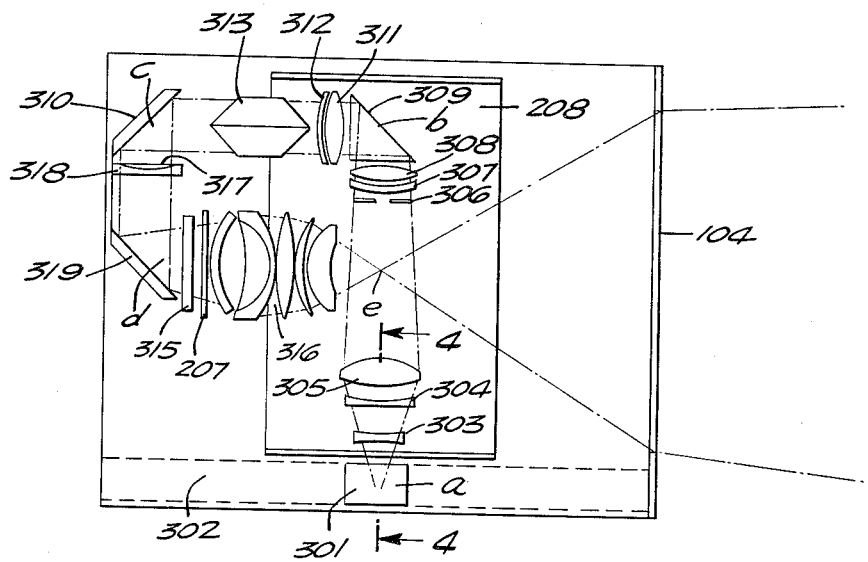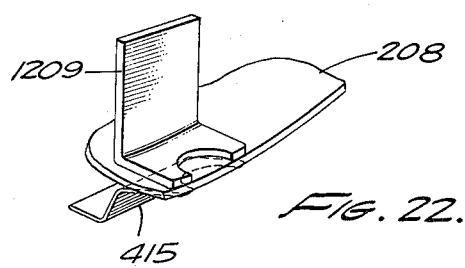

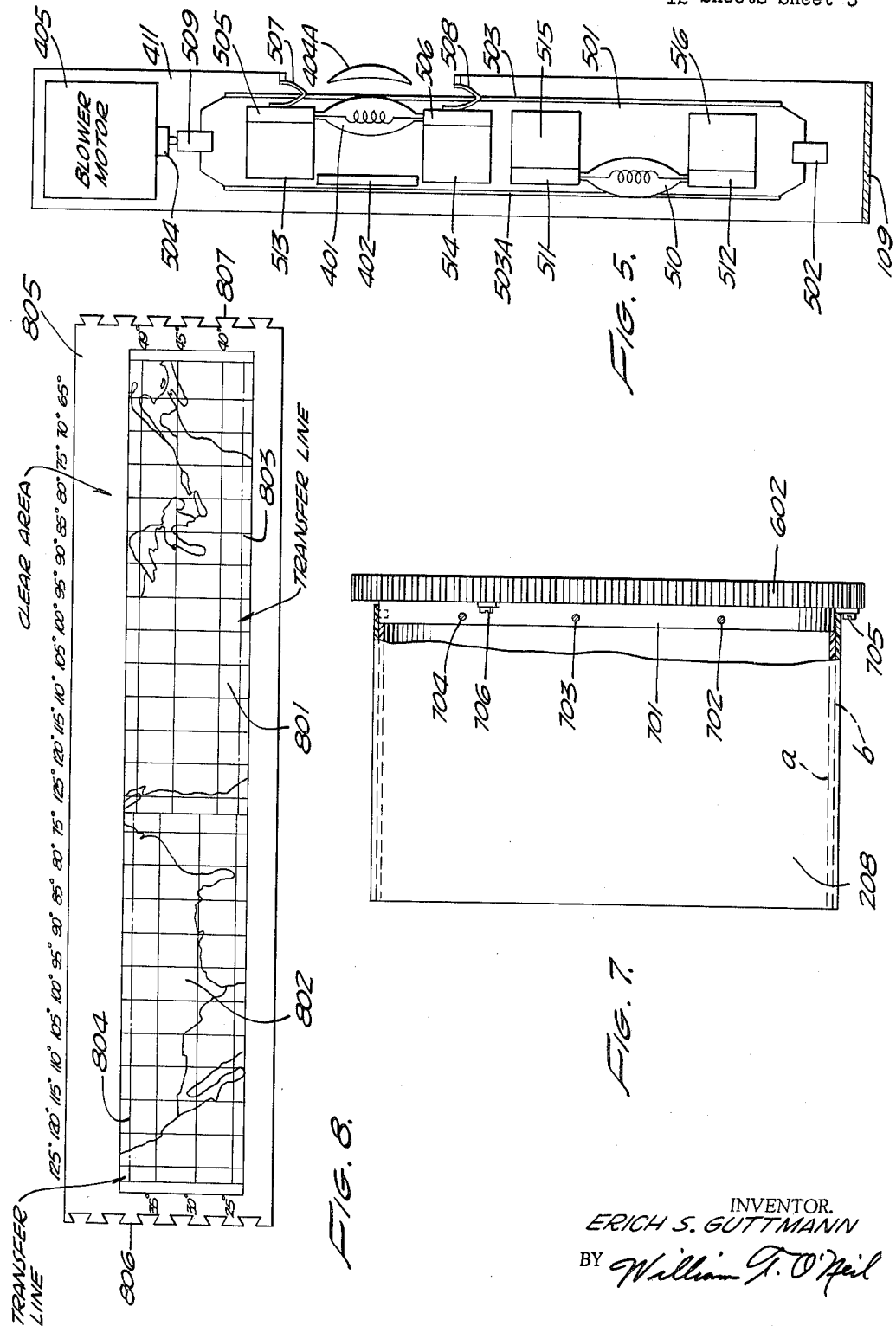
Oct. 5, 1965     E. S. GUTTMANN     3,209,645
NAVIGATIONAL SITUATION DISPLAY WITH CYLINDRICALLY SHAPED FILM
Filed July 18, 1962     12 Sheets-Sheet 3
INVENTOR.
ERICH S. GUTTMANN
BY William F. O'Neil
AGENT Oct. 5, 1965  E. S. GUTTMANN  3,209,645
NAVIGATIONAL SITUATION DISPLAY WITH CYLINDRICALLY SHAPED FILM
Filed July 18, 1962  12 Sheets-Sheet 4

INVENTOR.
ERICH S. GUTTMANN
BY William T. O'Neil
AGENT

Oct. 5, 1965   E. S. GUTTMANN   3,209,645
NAVIGATIONAL SITUATION DISPLAY WITH CYLINDRICALLY SHAPED FILM
Filed July 13, 1962   12 Sheets-Sheet 5
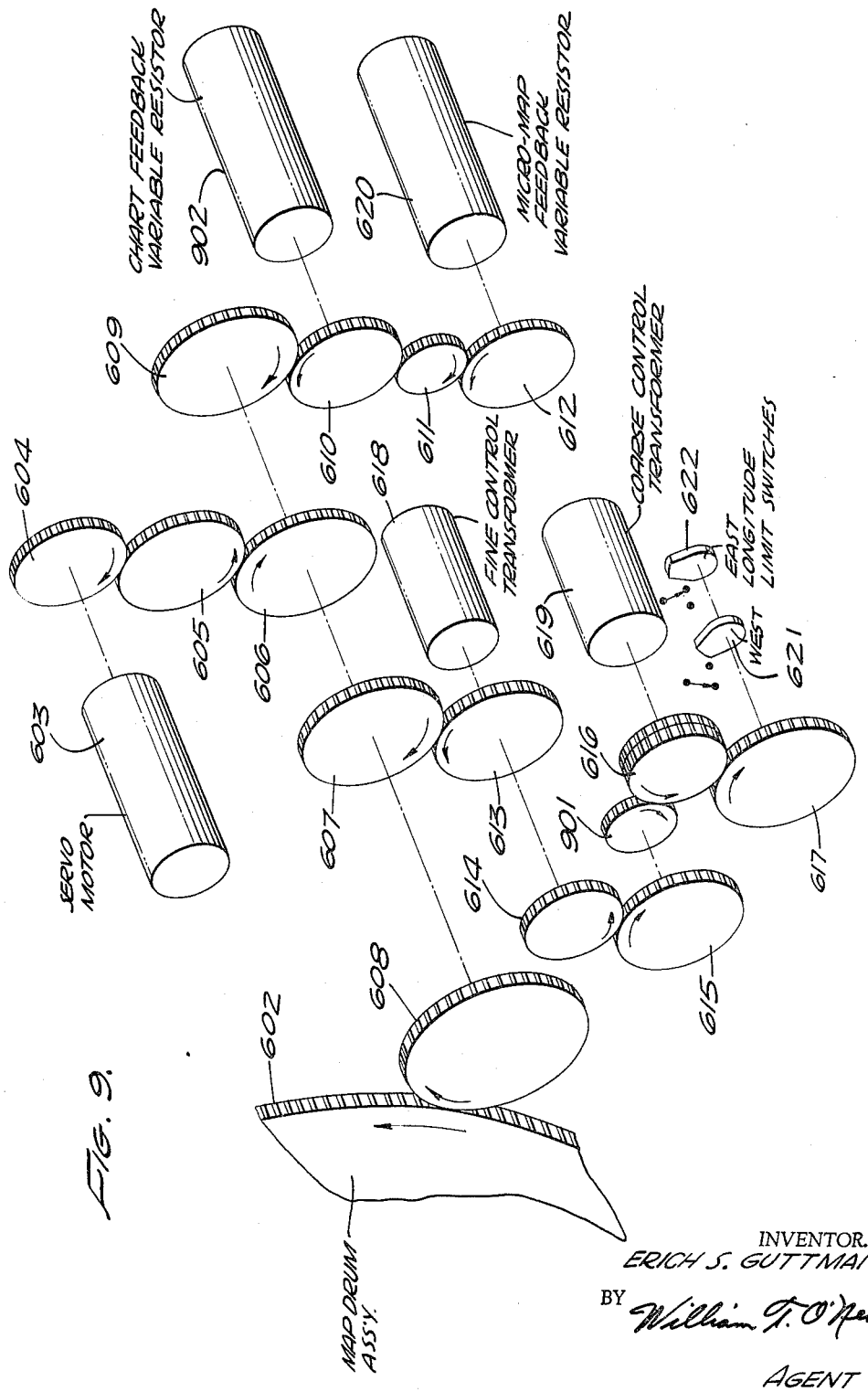
INVENTOR.
ERICH S. GUTTMANN
BY William F. O'Neil
AGENT

INVENTOR.
ERICH S. GUTTMANN

Oct. 5, 1965   E. S. GUTTMANN   3,209,645
NAVIGATIONAL SITUATION DISPLAY WITH CYLINDRICALLY SHAPED FILM
Filed July 18, 1962   12 Sheets-Sheet 7
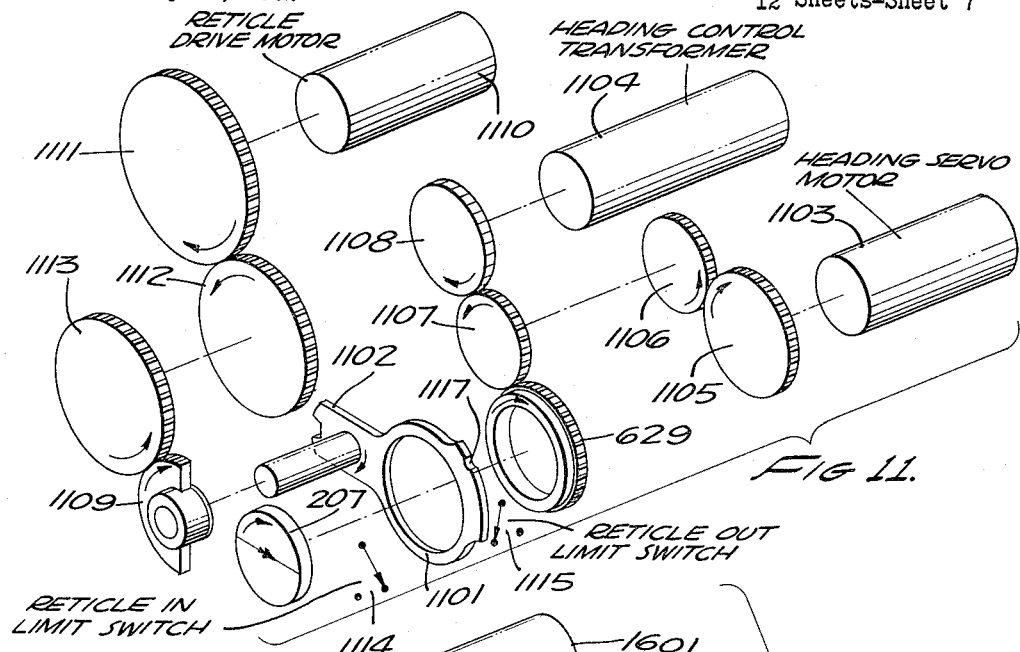
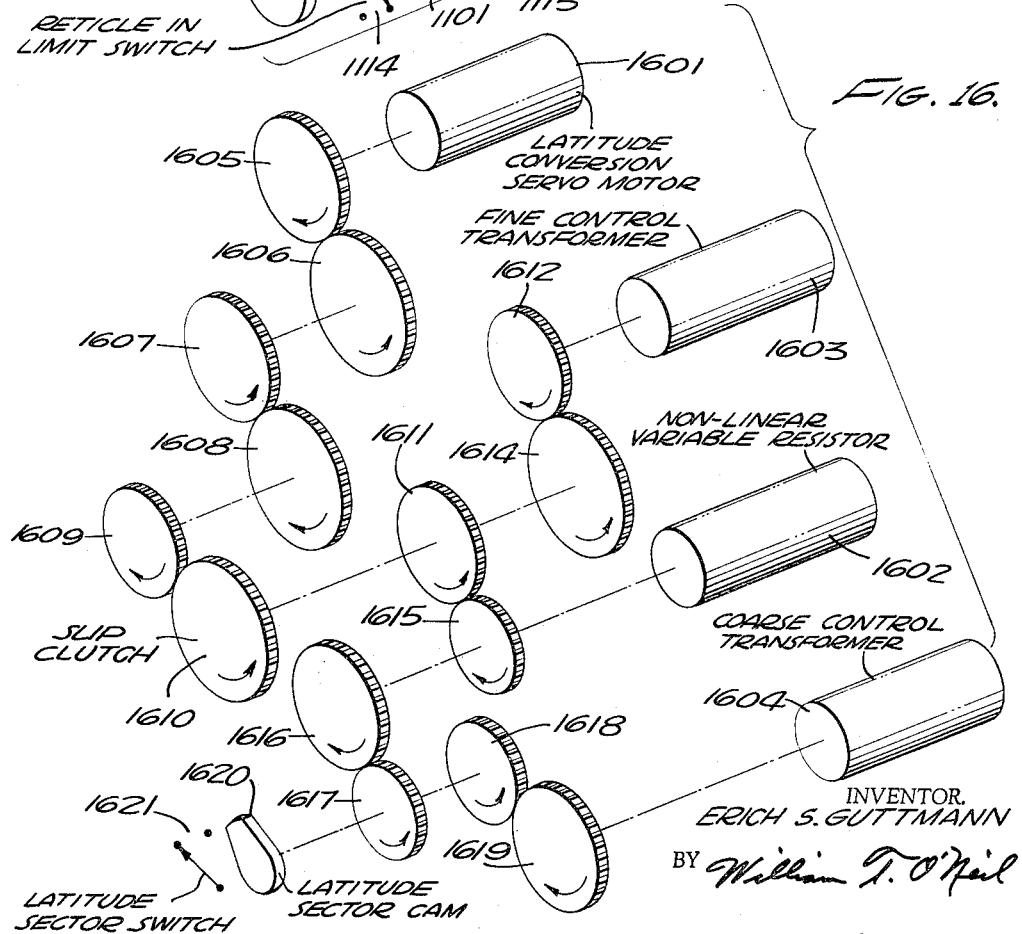
INVENTOR.
ERICH S. GUTTMANN
BY William T. O'Neil
AGENT INVENTOR.
ERICH S. GUTTMANN
BY William T. O'Neil
AGENT

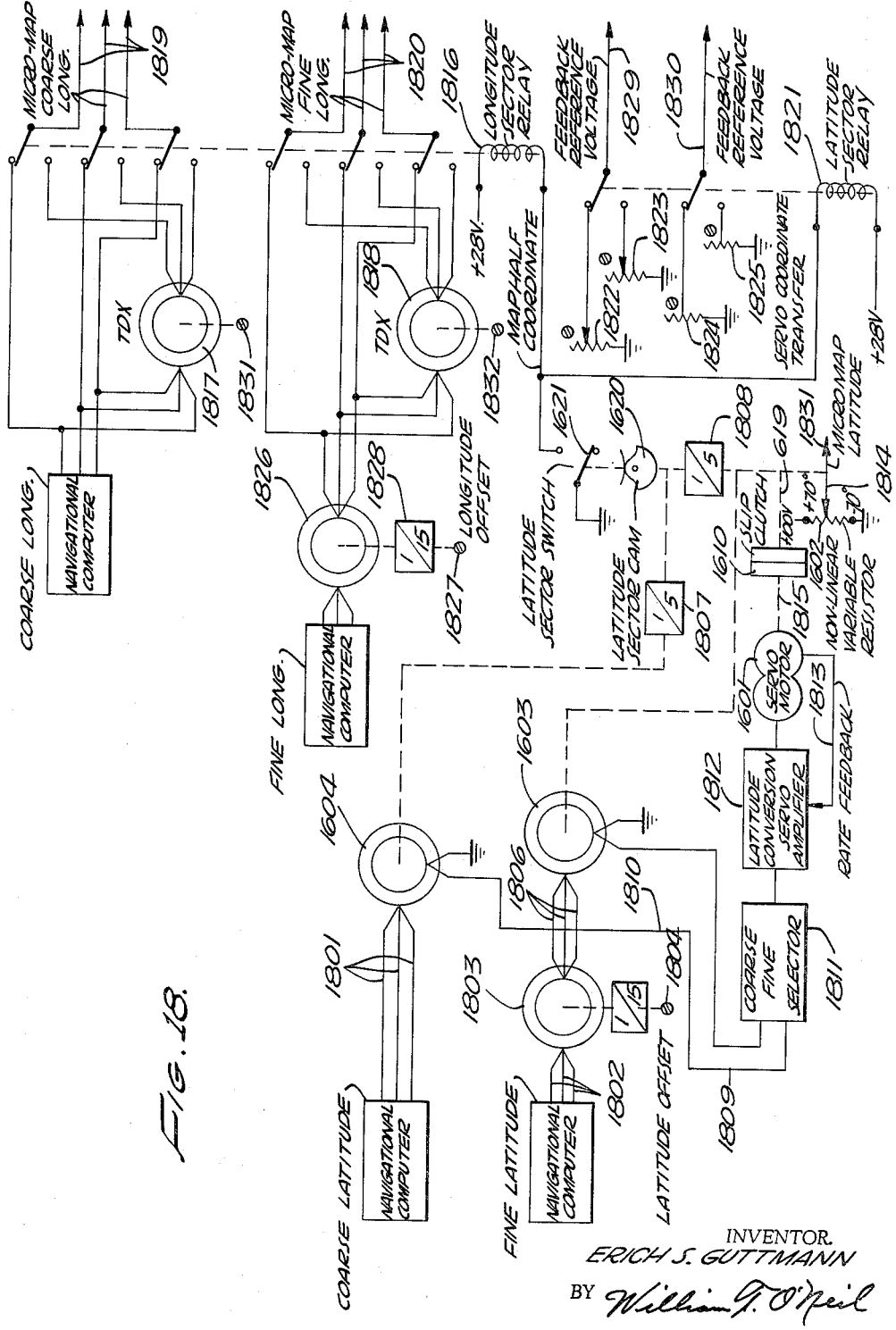

INVENTOR.
ERICH S. GUTTMANN
BY William T. O'Neil
AGENT

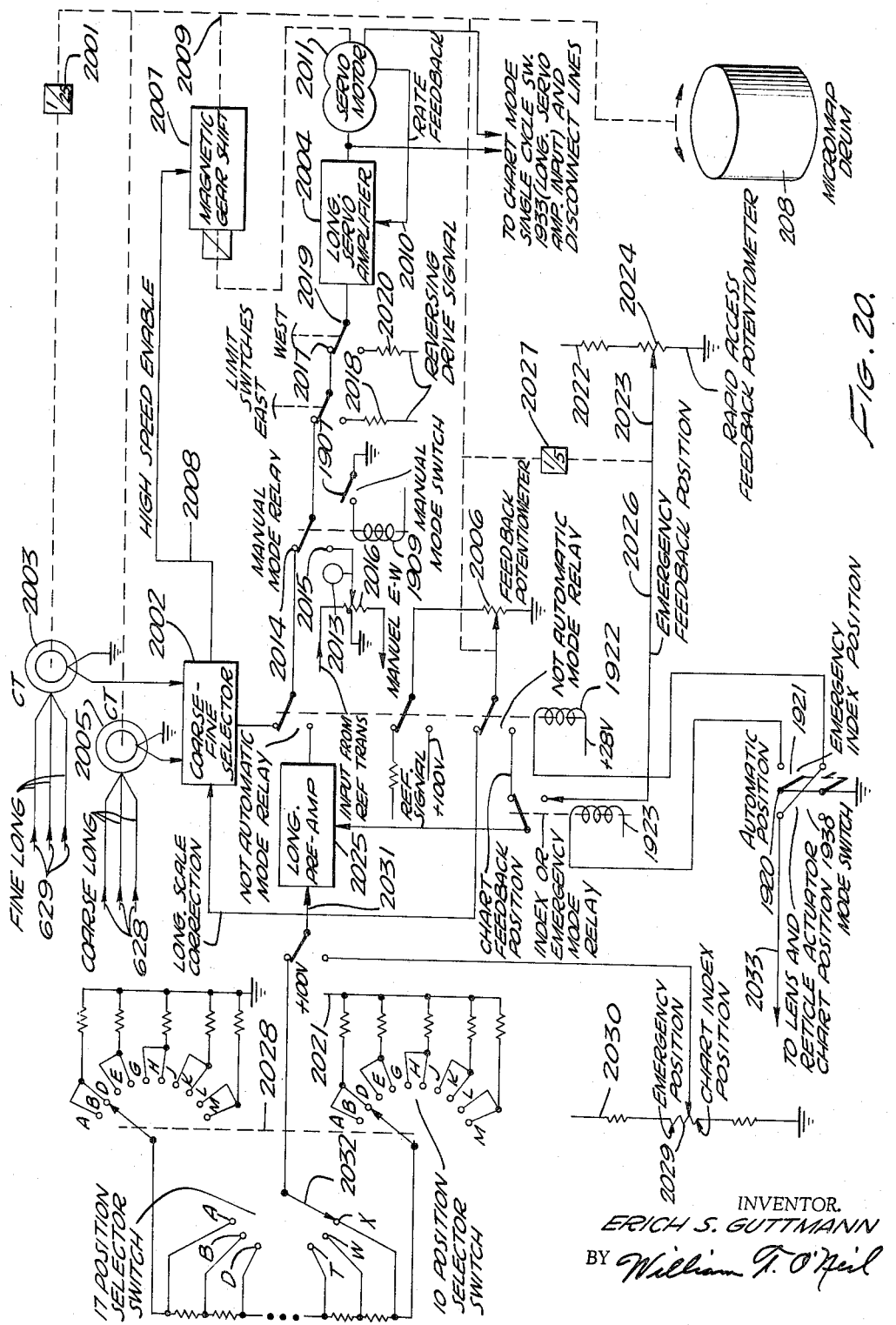

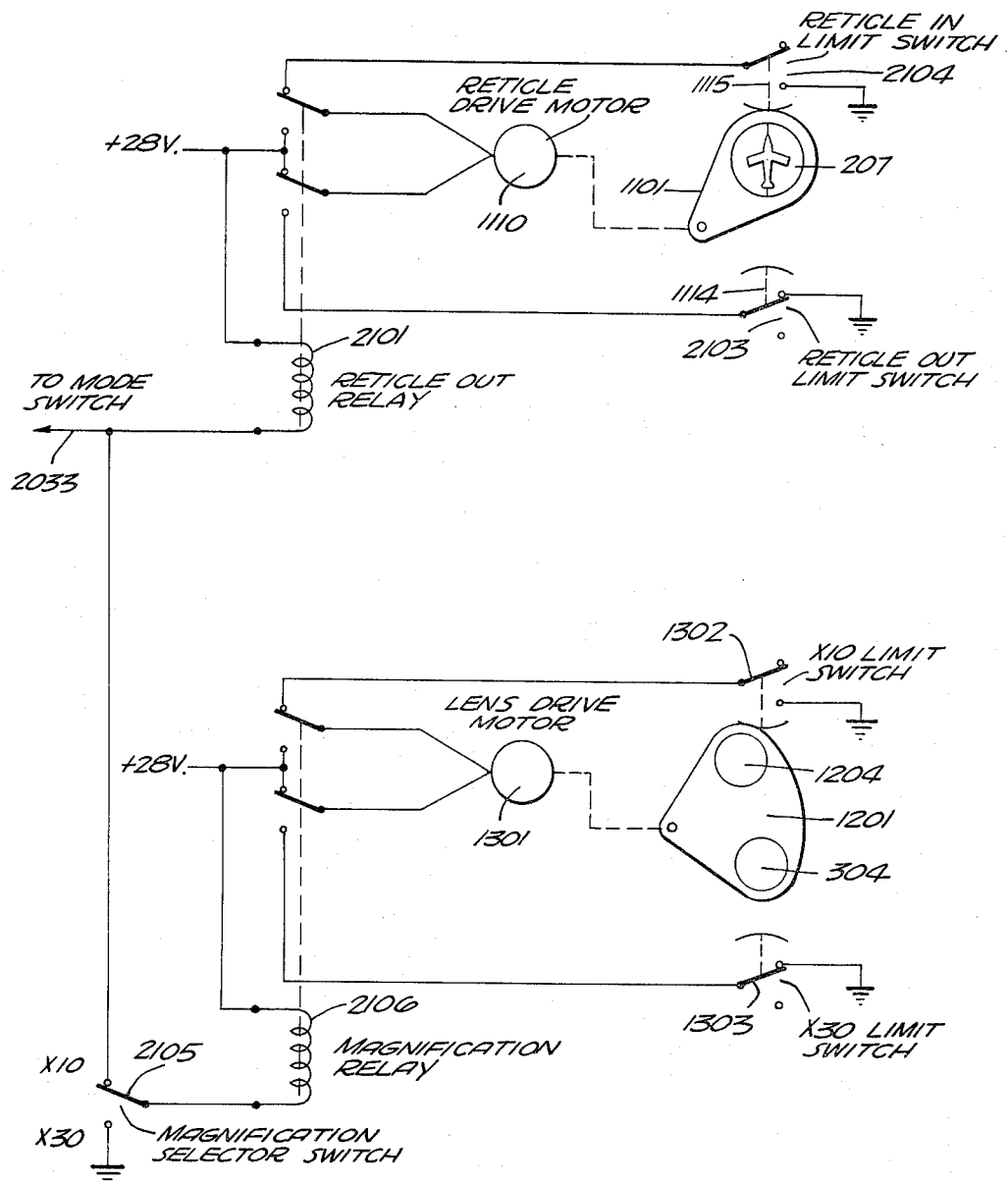

3,209,645
NAVIGATIONAL SITUATION DISPLAY WITH CYLINDRICALLY SHAPED FILM

Erich S. Guttmann, Pasadena, Calif., assignor, by mesne assignments, to International Telephone and Telegraph Corporation, New York, N.Y., a corporation of Maryland
Filed July 18, 1962, Ser. No. 210,742
11 Claims. (Cl. 88—24)

This invention relates to visual navigational displays and more particularly, to pictorial displays which are capable of visually indicating the geographical position of a vehicle in motion on land, sea, or in the air. In particular, the invention is highly compatible with modern air navigation, where vehicle speed rates are relatively high.

The pilot of an advanced aircraft operates an exceedingly complex machine at speeds, altitudes, and in environments which preclude (time-wise) the manipulation of maps or the manual computation of navigational or positional data. Accordingly, an increased navigational capability requires a sufficiently automatic navigational data presentation to be consistent with operational flexibility and to permit a maximum of time for aircraft control. In emergency operations, it is particularly vital for the pilot to be able to devote a maximum of time to the control of the aircraft, without sacrificing readiness of information as to the aircraft's course and position in relationship to predetermined points. With present day high altitude flying or even low altitude flights in adverse weather, the terrain over which the aircraft is flying is frequently obscured during much of the enroute flight time. Under these conditions, a visual navigation display, operating in conjunction with the aircraft's own navigational system (of one type or another) gives the pilot an artificial and continuously corrected view of the terrain being traversed. At the same time, visual instructions on a large variety of operational, unprogrammed, and emergency procedures which are not only highly desirable, but in some instances, vitally important, can be also presented. Obviously, the display itself must be instantly responsive, versatile, accurate, reliable and must have a large capacity for detailed and readily replaceable map data to correspond to any territory, situation or environment.

The present invention, a compact optical micro-projector with a computer-controlled micro-map transparency, is capable of meeting the above requirements, thus affording a novel navigational aid which effectively eliminates time consuming manipulation of maps and the computation of navigational data. In addition, the instant invention will effectively reduce human error in emergency situations by supplying predetermined action sequences upon demand, as for example, in the event of fire, forced landing, engine malfunction, or need for special procedures such as for a GCA landing. In fact, if desired, all pertinent information within the standard operating manual can be supplied for the particular aircraft.

Various types of map displays made to operate in conjunction with an aircraft's navigational system, have found prior art use. One such display is the direct vision type, which obviously cannot contain more information than the unaided human eye can resolve at the average viewing distance of the pilot. This type of viewing is only suited for sectional map displays; e.g., terminal navigation areas, etc. The reader may acquaint himself with the state of the art in respect to one current method of presenting a direct view pictorial display by reviewing "FAA to Evaluate New Pictorial Computer," by Philip J. Klass, an article appearing in Aviation Week and Space Technology (February 26, 1962) a periodical publication of McGraw-Hill Publishing Company, New York, New York.

The prior related art also has dealt with pictorial display in which an "earth-shaped" (spherical) micro-map transparency is used to provide accurate long distance en route (or orbital) navigation. The spherical map does not require corrected map projection such as is necessary when Mercator or Lambert type maps with their inherent area distortions are used. The practical difficulties inherent in this technique include the mechanical problem of suitably anchoring the map scale to the gimble mounting of the mechanism. Also, a concentric screen is required and the practical difficulty of producing accurate spherical transparencies easily modified and up-dated, is great. The July 11, 1960, issue of Aviation Week and Space Technology (publisher reference above) described a practical embodiment of spherical map projector instrumentations in an article entitled "Moving Globe Displays Pilot Position," by Philip J. Klass.

Between the extremes of direct-vision map strips and spherical maps are the commonly used flat glass slides which have the advantage of superior accuracy, resolution and stability, but the serious size limitation inherent in an airborne device imposes a practical transparency size maximum. While accurate photographic reduction of maps can be made to 1/200 size or smaller, it is not practical to build a positioning servo-mechanism of corresponding mechanical accuracies and mechanical resolutions, either to move the map or to move an optical system over its surface. Therefore, a combination enroute and terminal-type display usually resorts to a slide magazine arrangement because large micro-map flat plates, if servoed over their entire surfaces, are effectively four times as large as their actual areas (because of overtravel in two coordinates). Slide magazine arrangements introduce errors and complications because of the incoherency of the map material. The single large map solution requires a housing envelope twice the length and twice the width of the map for necessary overtravel, thereby increasing the overall size of the instrument unreasonably.

It is an object of the present invention to provide a visual navigational display requiring a minimum of space, weight and maintenance.

It is another object of the present invention to provide a device of increased accuracy to "tighten" the man-machine-space relationship by increasing the variety and quantity of available pilot information with respect to navigational and procedural situations.

It is still another object of the present invention to increase pilot efficiency in emergency situations by visual presentation of specific emergency procedures.

It is also an object of the present invention to make possible the use of photographs of standard map material in lieu of special map material.

It is another object of the present invention to present screen size frames of auxiliary information and independent overlays containing perishable information including emergency information which may be conveniently updated without disturbing permanent map data.

It is yet another object of the present invention to obtain vibration free optically projected micro-filmed data highly magnified, thereby permitting large micro-photographic storage and high resolution display of detail and terrain textures in color and/or black and white.

The present invention with its various operating modes, is actually a small system within a system designed to tighten the open loop of man-machine-space relationship by increasing pilot data rate input with respect to geographic orientation and aircraft manipulation. It can be adapted conveniently to military aircraft ranging in size and mission from small fast fighters to the largest bomber. Practical commercial uses range from single engine executive aircraft to the modern jet air-liner. As the description proceeds, it will be realized that the instant invention is highly adaptable to orbital flight.

For convenience, the practical embodiment of the instant invention herein illustrated, comprises three electrically interconnected subassemblies; a display unit, control unit, and data converter.

The geographic storage capacity of any display unit depends upon the desired map scales, as well as the area of map transparency which can be accommodated. It the described embodiment of the instant invention, this capacity was equivalent to the area of the continental United States, any part of which could be displayed at a scale of either 10 or 30 nautical miles per inch. A paper map, of equivalent storage capacity, would necessarily measure 15 x 24 feet. In addition, various auxiliary displays which will be discussed later, are included within the total storage capacity of a practical device according to the present invention. The large optical expansion required for projecting readable data onto the instrument package screen (approximately 7 inches x 8 inches size in the presently described embodiment) is provided by a folded projection lens system which picks up light from a small area of the cylindrical map transparency, the overall size of which is approximately 6⅜ inches in diameter by 4 inches in the axial dimension.

One of the more important features of the present invention is the cylindrical map transparency configuration and associated mounting, an arrangement which lends itself well to the effective use of photographic film materials and existing map transparencies. With respect to positioning servomotions, rotations of the cylindrical surface as one coordinate of geographic motion does not require overtravel space, accordingly extra space of overtravel is required only in the axial direction. Through unique packaging, most of the optical and mechanical components are arranged inside the drum. Thus, the drum itself is almost as large as the entire instrument, a film cylinder, 20 inches in circumference being housed in a practical instrument package as small as 7⅝ inches in one dimension. In the same embodiment, a map surface axial length of 3.8 inches fits within a housing length of 9½ inches, including allowance for overtravel.

The significance of this relatively large integral storage area is that, notwithstanding the small instrument envelope, standard navigation charts need not be reduced to less than 1/10 size. For a display of the continental United States, for instance, the full-size map scale of 1 inch=300 n.m.i.

In operation, the drum rotates with changing longitude and shifts axially with changes in latitude. The stationary optical projection system then projects an enlarged image of the changing locality on the front screen as the aircraft moves.

Assuming perfect computer and map inputs, mechanical position accuracy is within 3 nautical miles. The composite position error of the mechanism can be as great as 0.01 inch without exceeding a 3 nautical mile accuracy tolerance, and herein lies another substantial advantage enjoyed by a display according to the present invention. If the same mechanical error of 0.01 inch were applied to a typical terminal map of 1:25,000 (3.5 nautical miles per inch on the micro-map) the probable resulting position error of the display would not exceed 210 feet. Consequently, the cylindrical map configuration provides good information capacity, resolution, and accuracy thoroughly compatible with en route and terminal area navigation requirements without imposing extreme, expensive, and hard-to-achieve mechanical tolerance specifications on the mechanism itself.

The system of the present invention to be described, operates in several modes. In one of these modes, to wit, the automatic mode of operation, the position and heading of the aircraft is shown by an aircraft silhouette at the center of the screen over the moving map background. The display is illuminated to a brightness of about 50 feet-lamberts with a normal lens and about 150 feet-lamberts if a Fresnel lens is employed.

Navigational data such as latitude, longitude and course are supplied to the display by a navigational device of the dead reckoning computer type, an inertial guidance system, or a similar device.

When navigational "fixes" are obtained, the display can be manually adjusted by offsetting the zero point in both latitude and longitude. This is done by turning two accessible differential transformer controls.

By positioning a switch to index on a control unit, an index of the contents of additional information (beside the en route map) stored on the display's complete drum is obtained. Each item of information is coded, and after locating the code for a selected frame, the switch is set to the chart position. This causes the control mechanism to slew to the selected auxiliary chart or other data. As previously mentioned, information such as terminal charts, ground controlled approach instructions, and en route high altitude maps are typical of the variety of data which can be stored. Access time to any particular portion of this information is as little as two seconds.

The control unit also contains an emergency control which can bring about the display of emergency instructions reproduced from the aircraft's flight manual. Also on the panel are slewing controls which enable the pilot to slew over the maps (taking the display out of the automatic mode) and view a specific portion of the map. The system will slew between any two points within a maximum time of 10 seconds.

The map transparency mounted to assume the shape of a rotatable and translatable drum is oriented so as to have its axis of rotation approximately normal to the screen. The map transparency is illuminated from the outside perimeter of the cylindrical transparency by a high intensity projection lamp, inserted and removed from the instrument package in a reversible, double lamp cartridge. The image is "relayed" by an optical system comprising lenses and mirrors which result in the folding of the image three times. This produces an intermediate image centered a small distance behind the screen. Located at this intermediate point is a reticle with an aircraft outline engraved thereon and mounted on a cradle which is caused to rotate in synchronism with the heading output of the navigation computer. The projection lens, situated between the reticle and the screen produces a composite image on the translucent screen consisting of a shadow image of a heading oriented aircraft symbol over the moving map.

Drum rotation corresponds to longitude change, and its rotation is servo-controlled in response to the longitude output of the computer when operated in the autotmatic mode. The rotation of the aircraft reticle is similarly slaved to the heading output of the computer.

One of the most common and most useful map types for navigational purposes is the so-called Mercator projection. On such a map, distances measured in longitude and latitude variation (parallel to the equator) are visually exaggerated by an increasing amount as latitude increases, due to the inherent distortion resulting when spherical meridian lines are laid straight and parallel. In the Mercator map, however, land distance distortion in the direction parallel to the equator equals the distance distortion between meridians, and therefore longitude input data requires no correction or scale change as latitude changes.

The latitude output of the navigational computer must first be corrected however, because the Mercator map presents diverging latitude line spacings as latitude increases. A scale change factor proportional to the secant of the latitude angle is computed by a latitude conversion servo employing a non-linear variable resistor to appropriately fractionate the latitude input data which feeds the latitude drive servo. The latitude drive servo then rotates a lead screw thereby moving the drum back and forth corresponding to the corrected latitude changes.

Drawings are presented, briefly described:

FIGURE 3 is a diagram of the optical system within the display unit shown in FIGURE 1.

FIGURE 4 is a diagram of the illuminator assembly showing the reflector, condenser, heat rejecting system and means for holding the flexible drum transparency in exact position for precise optical positioning.

FIGURE 5 shows the special lamp carriage, enabling quick lamp replacement.

FIGURE 7 shows the method of securing the transparency to the driving mechanism.

FIGURE 8 shows a typical map transparency.

FIGURE 9 is a mechanical schematic of the longitude drive.

FIGURE 11 is a mechanical schematic of the reticle drive.

FIGURE 16 is a schematic diagram of the latitude conversion servo.

FIGURE 18 is the electrical block diagram of the latitude drive servo.

FIGURE 20 is the electrical block diagram of the longitude drive servo.

FIGURE 21 is a simplified schematic of the electrical configuration of the lens and reticle actuator drives.

FIGURE 22 shows the details of the stage.

Figure 1:
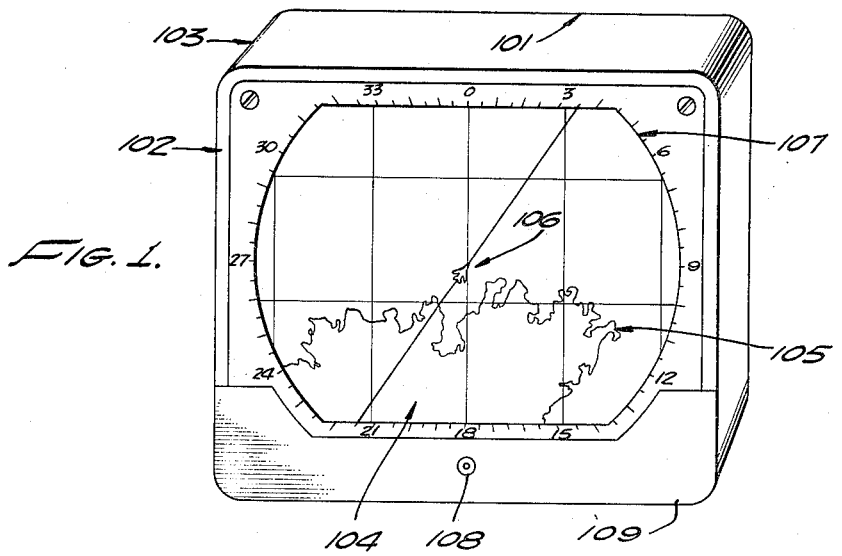
FIGURE 1 shows a suitable form for the display unit and illustrates the projected map presentation on the viewing screen.

The display unit shown pictorially in FIGURE 1 was constructed in approximately 9 x 7⅝ x 9½ inches (along edges 101, 102, and 103 respectively) and has a geographic storage capacity equivalent to the entire continental United States plus ancillary information which will be described. The screen 104 displays a rear illuminated (projected) map 105 which may be in color and which moves continuously with changing longitude and latitude under the centered aircraft marker 106. The marker rotates according to heading, which can be read at the graduated rim 107 of the screen. Knob 108 merely facilitates the removal of the access panel 109, for servicing.

Figure 2:
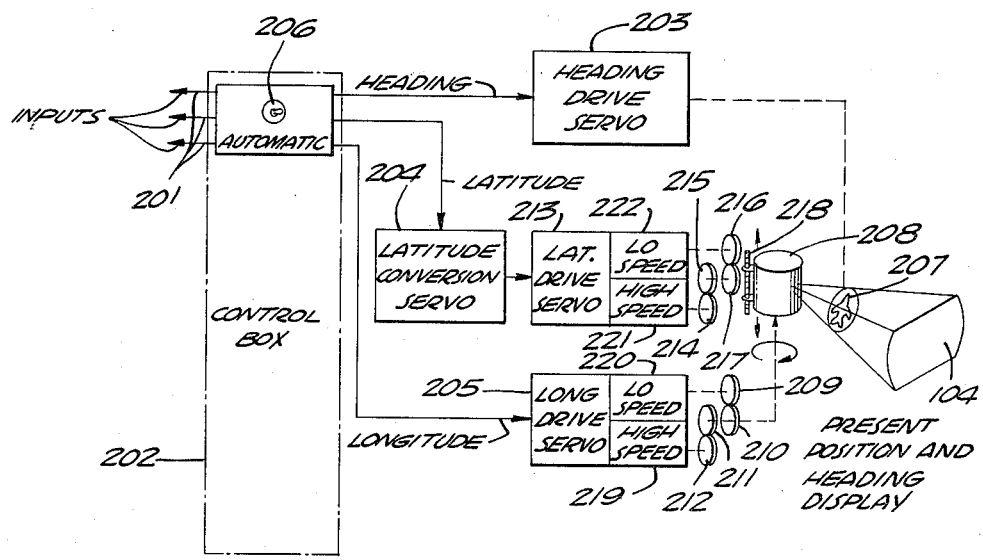
FIGURE 2 is the block diagram of the unique en route and data display system of the present invention.

Referring to the simplified block diagram of FIGURE 2, it will be noted that inputs 201 are those provided by a navigational computing system capable of deriving and supplying analog voltages proportional to the latitude, longitude and true heading of a vehicle in motion. If the navigational system is employed which does not have output signals compatible with the input requirements at 201, the said output signals would necessarily first be converted to the language of the present system. A digital set of data, for example, could readily be converted to the analog signals and scale factors acceptable at 201. The precise nature of signals at 201 is a matter of design, i.e.: they could as well be modulated A.C. as variable D.C. values, etc.

A typical navigational computer is the AN/ASN–7 which is capable of processing the output of a Doppler radar and gyro compass into analog voltages, which when properly instrumented, will provide continuous signals representative of latitude, longitude and true heading. The AN/ASN–7 is currently being used by the United States Air Force. The theory and operation of the AN/ASN–7 is discussed in considerable detail in T.O. (Technical Order) 5N 1–3–4–2, "Handbook Field Maintenance Instructions, Computer Set, Navigational AN/ASN–7," published by the United States Air Force, July 15, 1960, and distributed from AF Olmstead AFB (Air Force Base). This handbook is unclassified (in respect to military security) and can be procured through the Superintendent of Documents, U.S. Government Printing Office, Washington 25, D.C.

Referring again to FIGURE 2, the voltage inputs denoting heading, latitude and longitude are fed via the control box 202 to the heading drive servo 203, latitude conversion servo 204, and longitude drive servo 205, respectively. One of the several nodes of operation to be described as this specification proceeds is the common en route mode. To obtain the common en route mode of operation the mode control switch 206 is set to automatic. This slaves the rotation of the heading drive servo 203 and consequent rotation of the aircraft reticle 207 to the computer's true heading signal. The rotation of the longitude drive servo 205 is also then slaved to the computer's longitude output, which rotates the drum gears 209 through 212, thus rotationally positioning the drum transparency 208.

As indicated previously, the use of a Mercator projection map transparency requires a conversion since the scale of a Mercator in the north/south direction is proportional to the secant of the latitude. This computation is performed in the latitude conversion servo 204. Its output feeds the latitude drive servo 213 which, in turn, causes drive gears 214 through 217 to rotate and position lead screw 218, thus moving the drum transparency back and forth to establish position in latitude. It will be realized from the foregoing that use of a map wherein the longitude presentation is non-linear such as the Inverse Mercator, Lambert Conformal, Polyconic, etc., would require the inclusion of conversion in longitude similar to the latitude conversion servo 204 inserted prior to the drive servo 205.

The high and low speed drives 219 and 220, in longitude, and high and low speed, 221 and 222 in latitude, provide smooth motion of the map transparency at low speed with the 30 power optical magnification on the screen 104, and fast manual slewing for course planning and geographical inspection at high speed.

The optical system of the display unit shown in FIGURE 1 comprises a projector lens system and an illuminator as shown diagrammatically in FIGURE 3. The illuminator 301 is physically located along the lower left side as viewed on FIGURE 1 outside the map drum and consists of a lamp, a condenser, and a fan, all arranged in a duct 302. The projector components located inside the cylindrical transparency 208 comprise principally the rotatable reticle assembly 207, a twin projection lens turret, and a viewing screen 104. Many inovations of structure and function are contained in the optical system arrangement inasmuch as it employs a novel reversible projection lamp carriage, and lens system which, for compactness, is folded five times by intervening mirrors and prisms, in particular, at points *a, b, c,* and *d*. At point *e,* the light actually recrosses its own path.

The field of view at the point of the film transparency is ¾ inch diameter at 10 power and ¼ inch diameter at 30 power. The corresponding field curvatures are 0.022 inch and 0.005 inch, respectively. Both of these values exceed the depth of focus which can be expected from spherical optics for the required field and magnification.

Since the field curvature in the longitudinal drum direction is zero, a substantial astigmatism problem presented itself.

The most convenient solution is, of course, to use a field flattener made from fiber optics. A single field lens consisting of fused glass fibers cylindrical on one face and spherical or flat on the other could be introduced and positioned either in the object or in the reticle plane. That solution, however, was precluded because of the consequent loss of resolving power. Between the years 1959 and 1961, optical art developments have made possible the reduction of fiber diameter in field flatteners from 12–15 microns to 4–5 microns; however, even such an improvement allows only approximately 30 lines/mm. of resolution.

Because of the present unsuitability of fiber optics, solid optics with aspherical surfaces are used at strategic points in the system. Lenses 303, 304, and 305 comprise the "pick-off" lens group. Lens 303 has a cylindrical surface on one side and a toric surface on the other side to provide the required field flattening effect. Diaphragm 306 automatically swings into the relay system when low power magnification is used so that the screen luminance is reduced to the same level as results in using the high power stage. Collimation lenses 307 and 308 direct the maximum light toward prism 309 which in turn, direct the received light at a right angle toward reflecting mirror 310 via imaging lenses 311 and 312. It will be noted that a double dove prism 313 has been inserted between the imaging lenses 311, 312, and the reflecting mirror 310. Although the double dove prism 313 is not necessarily used in the present embodiment, it can be incorporated if desired. In the present embodiment a rotating reticle 207 inserted between the last relay lens 315 and the projection lens assembly 316 is used to indicate heading. This type of heading indication is generally referred to as "ground oriented." By fixing the position of the reticle 207 (as for example, north oriented) and rotating the double dove prism in consonance with heading, the map will appear to rotate to indicate heading in respect to the stationary image on the reticle. This type of heading information is referred to as "pilot oriented" since the map is seen in the manner of a pilot's view of the ground. Rotation of this prism would be accomplished by the reticle drive mechanism with appropriate gear ratio, and the reticle would remain stationary. The double dove prism generically performs the same function in this device as a single dove prism, but has the advantage of a better physical form factor.

As has been pointed out above, the present invention is adaptable to various types of maps and, therefore, is not restricted to the Mercator projection map. When a type of map is used, such as the Lambert Conformal, which does not present the meridians as parallel lines, the rotatable dove prism can perform an additional useful function.

It is desirable from a presentation point of view that meridian lines should appear erect or vertical on the display. In this way, a stationary north orientation of the map is maintained throughout the east-west component of movement of the vehicle. The same technique relied upon to effect latitude correction by means of a conversion servo and a driven non-linear element is applicable for the purpose of deriving an erection control signal as a function of longitude to be applied to the servo used to drive the dove prism. Since the geometry of the Lambert map provides for normalcy of the intersections of the meridians and parallels, the rotation of the display for effecting meridian erection automatically produces east-west alignment of parallels such that the presentation is in effect the same as is obtained with the Mercator map. The above described erection control signal must be added algebraically (through a differential transformer for example) to the heading reticle servo input, so that vehicle heading is correctly represented.

Intermediate lenses 317 and 318 are included to provide additional optical corrections. Reflecting mirror 319 provides the final right angle reflection in the relay system. The optical relay system thus produces a spherical image in the reticle plane, the curvature of which matches the field curvature of the projection lens 316.

Referring now to FIGURE 4, the illumination, heat rejecting, and condenser system will be described. A high performance projection lamp 401, of advanced design with a high-temperature quartz envelope of small diameter which is ruggedized for use in jet aircraft was found preferable in the practical embodiment herein described. In operation, such a lamp can provide as much as 3300 lumens with only 150 watts of input power into a filament of approximately $3/32$ inch x $7/17$ inch. By using a back reflector 402, this area is effectively doubled; therefore, the total flux emitted per unit area is:

$$L = \frac{3,300}{2 \times 0.094 \times 0.44} = 40,000 \text{ lumens/in.}^2$$

The corresponding source brightness is:

$$B = \frac{L}{\pi} = \frac{40,000}{\pi} = 12,700 \text{ candles/in.}^2 = 1/8 \times 10^6 \text{ candles/ft.}^2$$

It will be noted that this brightness is not dependent upon the size of the filament or the wattage, but rather on the color temperature of the filament.

Not only does this lamp afford efficiency and space saving, but the $1/4$ inch curvature radius of the envelope permits "hugging" of the lamp by an unusually large first condenser lens 404A, thereby catching as much as 90 degrees or 1.82 steradians of light in the entrance window of the optical system. In the present invention, due to the compactness of the display unit and the comparatively large size of the micro-map drum 208, a unique heat rejecting condenser system is employed. Light is re-directed with respect to the drum 208 from a tangential to a radial direction, thereby illuminating the transparency evenly and filling the aperture 414 of the projection system fully and at maximum photometric speed. In addition, heat is sufficiently removed to prevent cracking of the lenses or melting the photographic emulsion.

The lamp 401 is placed so that its filament is slightly above the center of a cold spherical back reflector 402 which re-images the filament 403 next to itself. This theoretically, doubles the useful light input into the wide-angle condenser lens group 404. A sufficiently large beam angle toward the drum transparency 208 is obtained by re-focusing the double filament 408 in an intermediate location and by using rare earth glasses of very high refractive index for the corner prism 406 and the last lens 407.

All other optical components of the condenser system are made from fused quartz to withstand the heat of the lamp without breakage. The isolation of extraneous convected and radiated heat, from the drum transparency 208, and the lens components of the instrument, is accomplished by heat barriers and heat-rejecting filters such as hot mirror 409, cold reflector 402, prism 406, and heat barrier shield 413.

Discrimination against infrared radiation is accomplished by coating the back reflector 402, with intrared-transmitting multi-layer dichroic mirror coatings, thereby to tend to pass infrared in the spectral region longer than 0.7 to 0.8 micron, while reflecting a large percentage of the incident visible light. Coatings are judiciously used to reflect infrared and transmit visible radiation or transmit infrared and reflect visible radiation according to need. The surface of the back reflector 402 has a cold mirror dichroic coating (i.e., tends to pass heat and reflect visible light). The deflecting prism 406, underneath the drum 208, tends to arrest (absorb) heat rays and transmit visible light. An intermediate air cooled filter plate, cooled by air from blower 405, is placed in the center of the condenser system 404, and is used as a hot mirror 409. The coating of 409 is such as to encourage visible light passage and impede and absorb heat which is carried away by the air stream.

The housing cover 411, on the outside of the display unit and a sheet metal shield 410, within the instrument package following the shape of the drum 208, form a partially isolated duct 412 throughout the length of the instrument. The glass epoxy heat barrier shield 413 has an aluminum coating on the side facing the condenser system 404. This double shield arrangement permits effective cooling by a miniature 40 c.f.m. high-speed blower motor 405. Air is drawn through the duct, sweeps past the lamp 401, the condenser optics 404 (which are mounted with ventilating openings), and is exhausted straight to the rear of the unit without affecting the film drum and those parts of the instrument within the drum.

The condenser optics are placed in the center cross section of the ventilating duct 412, with the cold reflector 402, to the outer lamp side, with the wide-angle system 404, to the inner lamp side, and the reflecting prism 406 beneath the lowest point of the cylindrical drum transparency 208. The leaf spring 415 is placed as close to the aperture 414 as possible and holds the drum transparency 208 in an exact position to provide precise optical positioning and good mechanical damping, thus making 30X airborne projection possible.

The net result of the above described heat barrier system is that, in spite of the enormous heat radiation from the lamp, there is no noticeable heat sensation at the drum transparency 208. Over 90 percent of the generated heat within the instrument package is dissipated, as disposable heat through this arrangement.

The failure of the projection lamp under actual operation could impose a serious problem.

As a general rule, most high reliability instruments employing projection lamps provide a spare lamp, solenoid operated lamp shuttle, or some other means for handling of "in service" lamp replacement. In the present invention, a unique method of quick lamp replacement was devised. The technique devised is in fact, adapted to any instrument in which quick change of a projection lamp is important.

Referring now to FIGURE 5, the lamp carriage enabling quick lamp replacement during periods of operation is shown.

The lamp carriage 501 is accessible when access panel 109 is removed. The entire carriage is removable and expendable. In operation, handle 502, which permits carriage withdrawal and insertion, may be warm to the touch, but is easily handled. Guides 503 and 503A, in conjunction with the carriage stop 504, positions lamp 401 into the condenser system between lens 404A and the back reflector 402. Arcing and possible welding of the lamp contacts 505, 506, and the spring contacts 507, and 508, which complete the filament circuit to the lamp 401, is prevented by microswitch 504 which opens and thereby deenergizes the lamp as the assembly is withdrawn, but before spring contacts 507 and 508 lose contact. In the event projection lamp 401 should fail, the lamp carriage 501 is pulled out and reversed, i.e., handle 502 is inserted first and handle 509 is now used to push the carriage 501 into position. Projection lamp 510 will then be positioned into the condenser system and projection lamp 401 will occupy the spare position. The lamp contacts 505, 506, 511, and 512 are mounted on blocks 513, 514, 515, and 516, respectively. These mounting blocks are fabricated from highly heat resistant material which also gives adequate electrical insulation between the lamp contacts and lamp carriage 501. Duplicate lamp carriages can provide a larger spare lamp percentage without major maintenance than possible in prior art equipments of this type. Blower motor 405, shown in FIGURE 5, is the same blower as illustrated in FIGURE 4, and, as previously discussed, is used in cooling the illuminating components. The overall efficiency of light transmission through the optical system was 50 percent in a practical instrument, notwithstanding the many optical components included. This efficiency is due in large measure to the cold mirror 402 and lens 404A which capture a large fraction of the emitted light.

The total thickness of the optical glass or quartz through which the light passes, averages 12 cm. Transmission per cm. is 99.5 percent for light crown and 97 percent for dense flint or good optical quartz. According to quantities used, the transmission averages 99 percent per cm. or $0.99^{12}(=89$ percent) for the total series glass thickness of 12 cm. Of the four elements 309, 310, and 319, shown in FIGURE 3, and reflecting surface 406 of FIGURE 4, 309 and 406 are prisms yielding 99 percent internal total reflection each. The two mirror surfaces 310 and 319 carry dielectric multi-layer coatings plus protective silicon-monoxyde coatings, yielding 95 percent of nearly neutral visual spectrum reflection per surface. Therefore totals $0.99^2 \times 0.95^2 = 0.89$. Lenses with anti-reflection two layer magnesium fluoride coatings allowing 87 percent of the light to pass are used in the system. Thus the total transmission efficiency of the system is extremely high, notwithstanding the large number of optical components.

Figure 6:
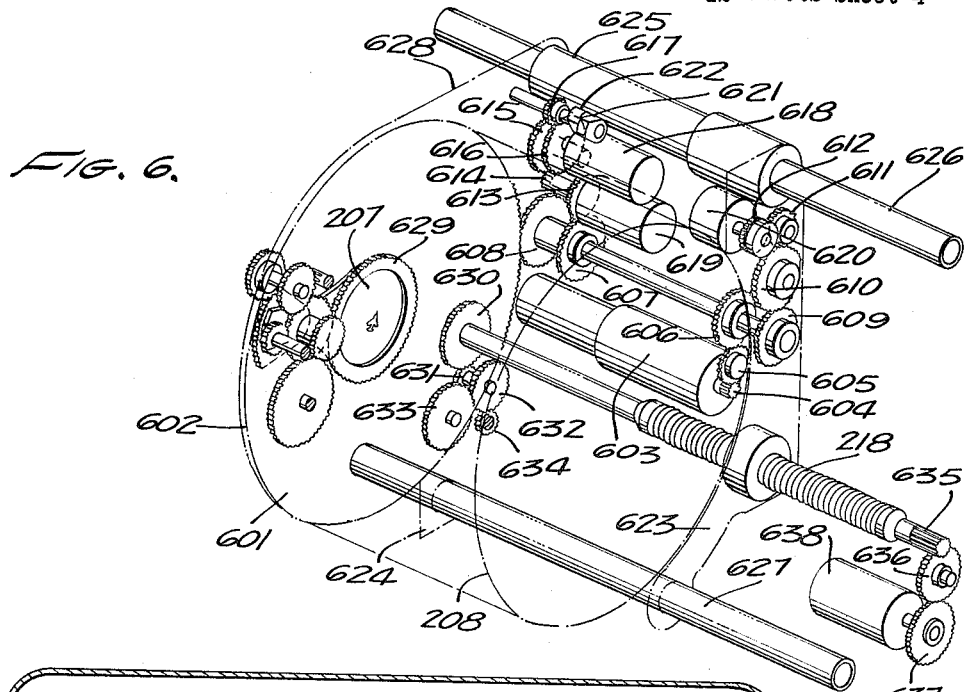
FIGURE 6 shows the mechanical configuration of the mechanism used to drive the map drum transparency.

FIGURE 6 shows the internal mechanism of the display unit. For the sake of clarity, the housing cover, screen, and projector unit are not shown. The map drum assembly 601, comprises the drum transparency 208, fastened to the ring-shaped longitude drive gear 602.

Leaving FIGURE 6 for the moment, and referring to FIGURE 7, showing the drum transparency 208, and method of securing the transparency to the ring-shaped longitude gear drive 602. The drum transparency is secured to a shoulder 701 on the ring gear 602 by means of screws 702, 703, and 704. The cylindrical drum transparency 208 consists of two layers $a$ and $b$. The outer layer $b$ is firmly connected, as just mentioned, to ring 701. The ring 701 is then connected to the ring gear by the ring securing screws typically 705 and 706. Actually there are three ring securing screws, 120 degrees apart, each securing a vestigial flange on 701 to 602. The outer layer $b$ of the drum transparency 208 has its photographic emulsion on the inside and the inner layer $a$ consisting of a full size overlay is inserted into the drum, with its emulsion to the outside so that the information on both micro-photographs (micro-map and micro-chart) is in a common focal plane.

Processes are available to stabilize film bases by cementing them to glass or to quartz from which an accurately round thin cylinder may be fabricated. However, the present invention uses film base materials directly. Flexing of the micro-map, in particular, is important in respect to the sharpness of the screen image under vibration. Thus it is not necessary to make the drum perfectly round and to make its motion perfectly concentric. Instead, the map is fed over a mechanical stage arranged at the proper working distance in front of the "pick-off" lens.

Under the circumstances, the best available commercial material giving the maximum photographic resolution appears to be polyester material for the micro-map and either polyester or any common micro-film material for the chart overlay may be used. Color is applied to the maps by dye transfer.

Referring to FIGURE 8, an example is shown of the micro-map used in the instant invention. It will be noted that the area of the United States has been divided into a northern and southern half, 801 and 802, respectively, to better fit the form factor of the drum surface. The two maps are arranged diagonally opposite in respect to longitude. As soon as the aircraft marker crosses the transfer line 803, southbound, or transfer line, 804, northbound, the map will slew automatically into the corresponding position on the opposite map. Transfer lines 803 and 804 should overlap in latitude by some amount (at least 50 miles for a cross country map) so that the drum will not tend to hunt by slewing back and forth continuously if the aircraft flies along either 803 or 804. In this example, the micro-map is an integral part of the drum and the micro-chart strip is an overlaid film strip positioned in chart area 805. The map ends 806 and 807 are joined by dovetails to maintain flexibility, round shape, and good mechanical balance. Any pressure-sensitive, highly flexible binding type of tape can be used to join the dovetails together. Mylar tape is particularly adaptable for this purpose.

Referring to FIGURE 6 and also to FIGURE 9, the longitude drive train is shown in exaggerated form. The servo motor 603 provides both slow-speed tracking and high-speed slewing by means of an electrically shifted two-speed gear box. Gears 604, 605, 606, 607, 608, and 609, comprise a gear train which drives the longitude drive gear 602, control transformers 618, 619, and feedback variable resistors 902, 620, through reducing gear drives. Gears 613, 614, 615, 901, 617, and 616 form a reducing gear drive which provides a vernier for the fine and coarse control transformers 618 and 619. The reducing gear drive comprising gears 609, 610, 611, and 612 drive the micro-chart and micro-map feedback variable resistors, 902 and 620. The range of the total motion of the gear drives is limited by the west-east cam-actuated switches 621 and 622, respectively. This entire arrangement is combined in a cradle consisting of two end plates 623 and 624 held together by tubular spacers 625 containing ball return guide slides 626 and 627. The back plate 628 of the cradle supports and guides the drum gear 602.

Figure 10:
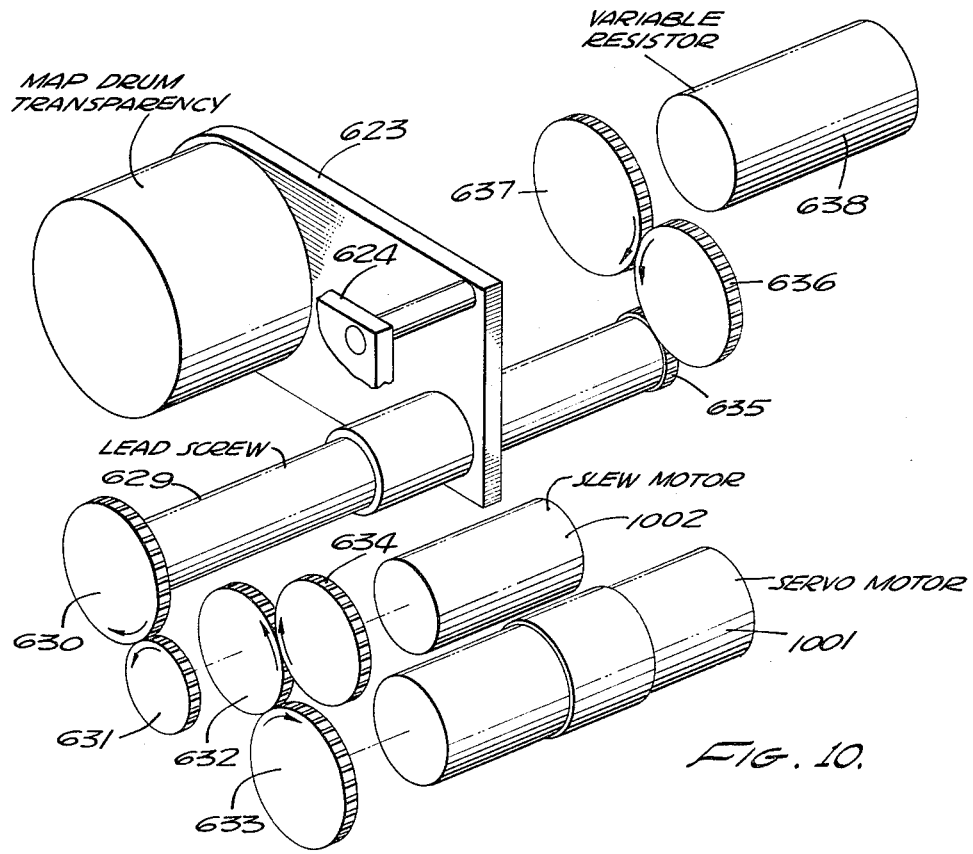
FIGURE 10 is a mechanical schematic of the latitude drive.

Continuing on FIGURE 6 and referring also to FIGURE 10, an expanded drawing of the latitude drive train. The latitude drive train positions the map cradle 623, 624 back and forth by means of a precision ball return drive screw 218. The gear train comprising gears 630, 631, 632, 633, and 634 driven by either the servo motor 1001 or slew motor 1002 drives the lead screw 218 to position the cradle 623, 624. The gear 635 on the opposite end of the drive screw 218 drives gears 636 and 637 which position the variable resistor 638. FIGURE 6 also shows the reticle 207 and an approximate arrangement of the associate gear drive. The reticle assembly provides the means for adding heading information to the display and for withdrawing the reticle when heading information is not desired, as during display of micro-chart data. An exploded view of the reticle drive train is shown in FIGURE 11. The large bore of the annular reticle drive gear 629 holds the reticle. The outside of the gear hub 1101 is fitted to a swing lever 1102. The swing lever is chained to segment gear 1109 through drive shaft 1116. The heading servo motor 1103 driving the gear train comprising gears 1105, 1106, 1107, 1108, and reticle drive gear 629 positions the reticle 207 and rotor of the control transformer 1104. The reticle swing lever 1102 can be moved on or off optical center by a gear segment 1109 driven by the reticle drive motor 1110 via gears 1111, 1112, and 1113. The "reticle-in" limit switch 1114 and "reticle-out" limit switch 1115 limits the travel of the swing lever 1102. Indentation 1117 engages a spring loaded ball bearing fixing the reticle position in respect to the projection lens.

Figure 12:
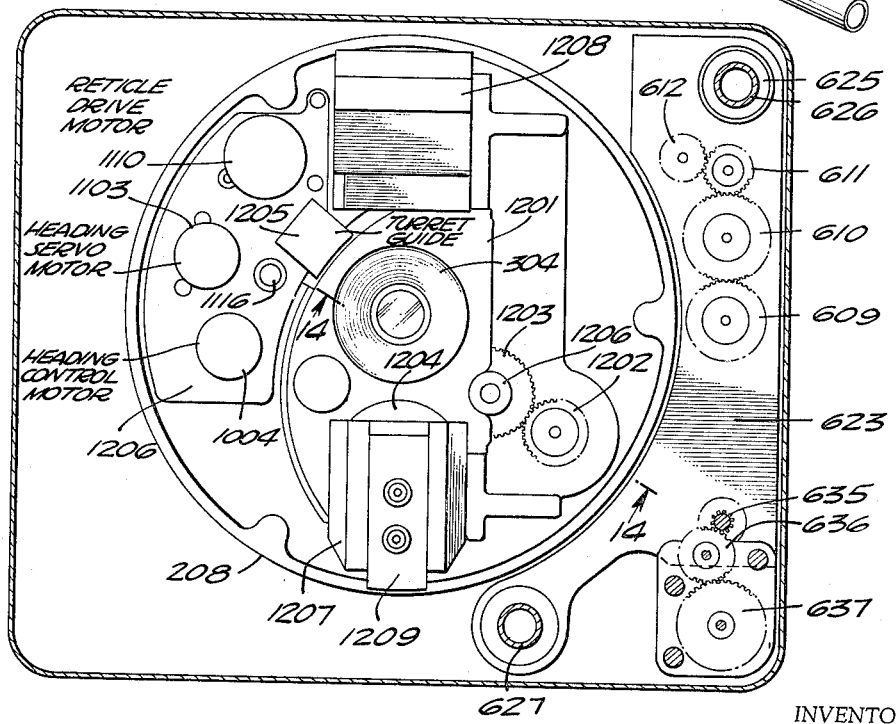
FIGURE 12 is a view of the mechanical and optical layout of the display unit as viewed from the front when the screen is removed.

Referring to FIGURE 12, the mechanical and optical layout of the display unit as viewed from the front when the screen is removed. The lens turret plate 1201, holding the high and low-power lenses is rotated into position by gears 1202, and 1203. Gear 1202 is connected to the shaft of the turret drive motor which in turn drives the turret gear 1203, thus positioning either the high-power lens 1204 or low-power lens 304 into the optical system. The turret guide 1205 acts as a turret support holding the turret within a pre-determined radius during rotation, thereby allowing no undue strain on the pivot point in addition to insuring proper lens alignment. An exploded view of the lens turret 1201 and driving mechanism is shown in FIGURE 13.

Figure 13:
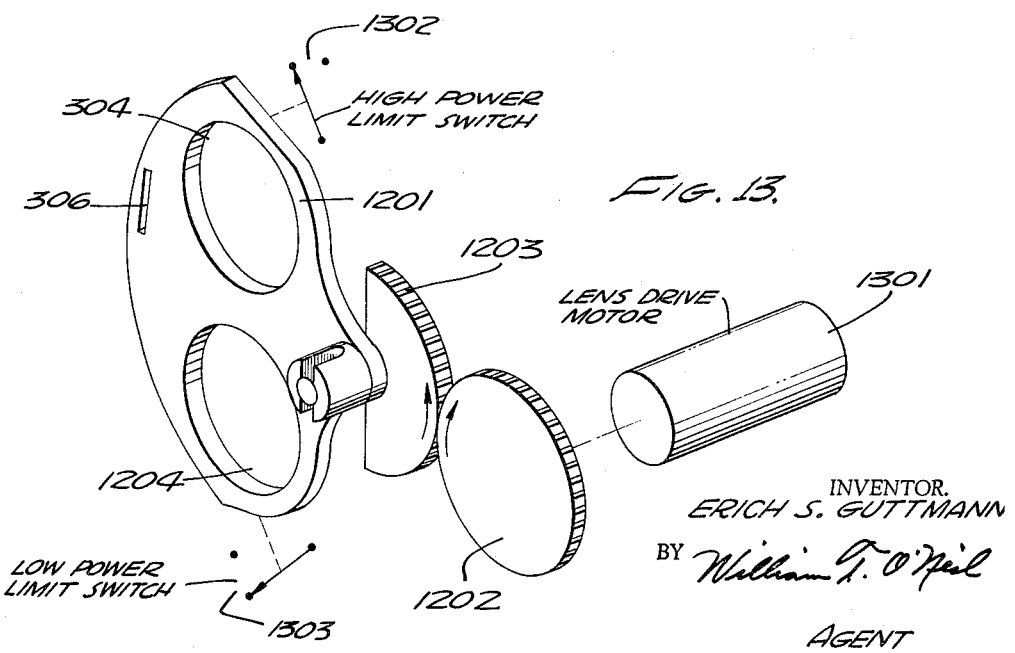
FIGURE 13 is a schematic diagram of the lens turret.

Referring to FIGURE 13, two projection lenses 1204 and 304, of different focal lengths are used to obtain two different optical magnifications, i.e., two different map scales on the screen. These lenses 1204 and 304 screw parfocally into the turret plate 1201 that swings into alternative operating positions by action of lens drive motor 1301 and associated gear train 1202, 1203.

The lens turret 1201, as previously mentioned, is provided with a diaphragm 306 that swings into the relay lens system when low-power magnification is used, so that screen luminance is reduced to the level of the high-power stage. The high-power limit switch 1302 and low-power limit switch 1303 limit the turret travel, accurately stopping 1301 and thereby positioning the selected lens. In addition, lens holder 1207 supports the stage 1209 defining the focal plane.

Figure 14:
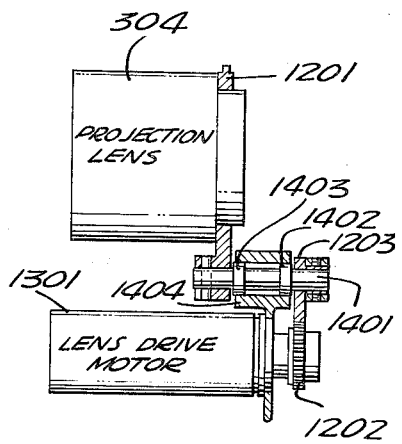
FIGURE 14 shows the cross section of the lens turret as designated in FIGURE 12.

Referring now to FIGURE 14, the cross section of the lens turret 1201 as designated in FIGURE 12 is shown. Shaft 1401 rotates within ball bearing races 1402 and 1403. The bearing races are press fitted into the bearing housing 1404. Other parts shown therein have been described in previous paragraphs, therefore only the identification numbers have been brought forward. As an example, the 1200 series numbers should be referenced back to FIGURE 12, and associated paragraph for details. The same applies to any other drawing, wherein the part has been previously described or referred.

Referring again to FIGURE 12, the reticle heading servo motor 103, heading control transformer 1104, reticle drive motor 1110, and drive shaft 1116, previously described, are supported by reticle support 1206. The parts layout and gear drive arrangement is shown in detail in FIGURE 15.

Figure 15:
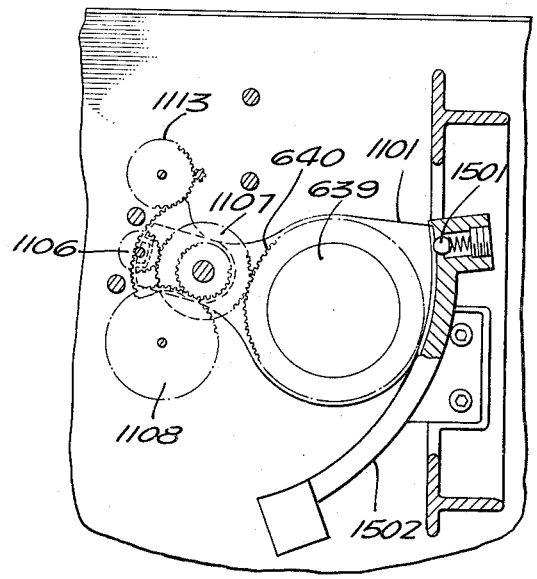
FIGURE 15 shows the means for accurately fixing the position of the reticle in respect to the projection lens.

Referring to FIGURE 15, the ball point spring plunger 1501 accurately fixes the position of the reticle 539 in respect to the projection lens. The turret 1101 is guided into and out of position by the reticle guide 1502. The gear drive therein is shown in exploded form in FIGURE 11, and has been previously described. Therefore, the numbers for identification purposes only, have been brought forward.

Referring to FIGURE 22, the details of stage 1209 will be seen. Stage 1209, in conjunction with spring leaf 415, holds the map transparency 208 in a constant focal plane. This also provides mechanical damping, making possible the 30X magnification of the micro-film without any noticeable defocusing under the vibration conditions encountered in aircraft.

Due to the use of the Mercator projection in the embodiment of the present invention, latitude position data, as previously discussed, must be converted to conform to the non-linear Mercator map scale. This conversion is accomplished in the latitude conversion servo.

Referring now to FIGURE 16, the latitude conversion servo is shown in exploded form. The latitude data from the aircraft's navigational computer, (in a typical case, the AN/ASN-7) is fed to the stator winding of the fine synchro control transformer 1603 and the coarse synchro control transformer 1604. The resulting alignment error between the stator winding and the rotating winding of the control transformers 1603 and 1604 cause rotation of the latitude conversion servo motor 1601, thus driving the gear train comprising gears 1605 through 1619, which include slip clutch, 1610. This action positions the non-linear variable resistor 1602 to provide latitude position data according to the Mercator map scale. The map section to be displayed is selected by the latitude sector switch 1621, the position of which is controlled by the latitude sector cam 1620.

The practical embodiment of the present invention described in this specification has five different modes of operation which are initiated and controlled electrically;

however, it should be pointed out that the modes of operation to be described are representative only, and various additions and modifications will suggest themselves to those skilled in the art.

Briefly, the modes of operation presented herein are:

(1) Automatic mode: Displays the aircraft's ground track and position as derived from longitude, latitude, and heading signals supplied by a navigational computer.
(2) Manual mode: Enables the operator to manually and arbitrarily scan the map or contents of the micro-charts.
(3) Emergency mode: Rapidly provides an emergency procedures index and access to emergency check lists.
(4) Index mode: Displays position code number lists for the various terminal and enroute charts.
(5) Chart mode: Positions the display in response to a selected chart position code entry.

These modes, as previously explained, are initiated at the indicator control box by switching circuits which control the heading, longitude and latitude servo systems. Mode transfer occurs when the relay circuits are activated manually and/or automatically.

Figure 17:
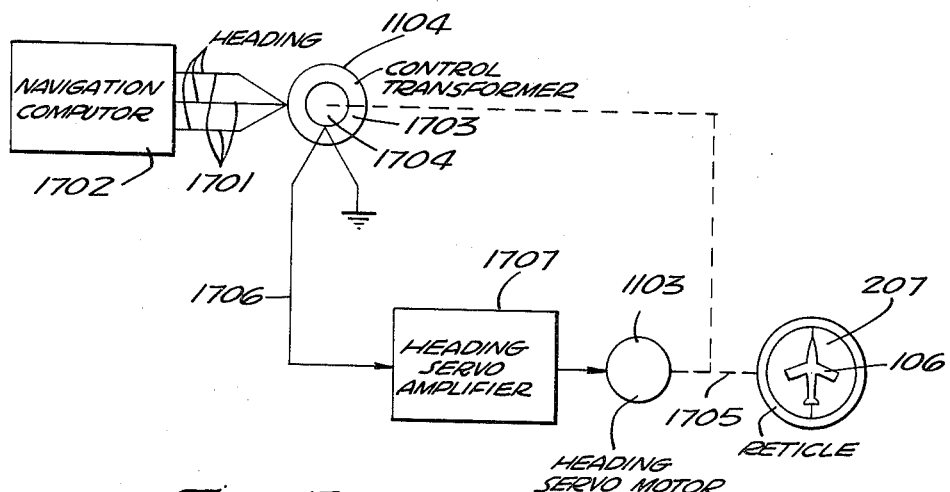
FIGURE 17 is the electrical block diagram of the heading drive servo.

Referring now to FIGURE 17, an electrical schematic diagram of the heading drive servo is shown. Heading data 1701 is received from the navigation computer 1702 as a 3-wire, 11.8 v. A.C., 400-cycle synchro positioning reference signal. This signal is applied to the stator winding 1703 of the heading servo control transformer 1104. The rotor 1704 of the control transformer 1104 is coupled to the recticle drive shaft 1705 and any difference between the computed heading and the heading shown by the reticle 207 results in a corresponding error signal from the control transformer 1104. The error signal 1706 is fed to the heading servo amplifier 1707, amplified and in turn applied to the heading servo motor 1103 which drives the rotor 1704 of the control transformer 1104 to an error null position. The displayed reticle image 106 then corresponds to the computed ground track heading.

Referring to FIGURE 18, the latitude conversion servo electrical schematic appears. Latitude data is received as two sets of 3-wire 11.8 v. A.C., 400-cycle synchro reference signals (as from the AN/ASN-7) which represent coarse and fine precision positioning in latitude. Coarse latitude data 1801 has a scale factor of one (1) degree of shaft displacements for one (1) degree of latitude, and fine latitude data 1802 has a scale factor of one (1) degree of shaft displacement for 1/25 degree, or 2.4 minutes, of latitude.

A synchro differential transformer 1803 is placed in series with the fine latitude data 1802 to enable the operator to introduce minor corrections to the displayed position via the "latitude offset" control 1804 which is coupled to the rotor of 1803 through the 15-to-1 gear drive 1805 enabling corrections to ±15 minutes of latitude. The output 1806 of the differential transformer 1803 is applied to the stator winding of the fine latitude control transformer 1603, and the coarse latitude data 1801, is connected directly to the stator of the coarse latitude control transformer 1604. The rotor shafts of the two control transformers 1603 and 1604 are coupled into the servo gear train, maintaining the 25-to-1 ratio between the fine and coarse positioning data by means of reduction gear drives 1807 and 1808.

The two displacement error signals on lines 1809 and 1810 pass through the coarse-fine selector 1811. The sum of the two modified error signals is then amplified by the latitude conversion servo amplifier 1812 and applied to the servo motor 1601 which drives the servo system to the proper error null. Rate feedback 1813 is employed within the servo system for servo motor 1601 damping and smooth tracking at low speeds.

The latitude conversion servo system performs two functions:

(1) It positions the arm of the non-linear latitude function variable resistor 1602.
(2) It transfers the micro-map coordinates during a change of sector of the micro-map drum.

The angular shaft position of the non-linear latitude variable resistor 1602 is proportional to degrees of latitude. When rotated, the non-linear variable resistor 1602 produces a D.C. output at moving contact 1814, proportional to the latitude displacement of the Mercator map. The servo motor drive shaft 1815 is disengaged by slip clutch 1610 when the moving contact 1814 of the non-linear latitude variable resistor 1602 reaches either end of its extreme position. The moving contact 1814 denotes the micro-map latitude and the voltage thereon is subsequently fed to the latitude servo system via the micro-map latitude line, 1831.

Since the micro-map in the present embodiment is divided into northern and southern sectors, the longitude and latitude servo coordinate references must be changed as the computed position passes from one sector to the other. The longitude sector relay 1816 selects the navigational computer's coarse longitude data direct or via differential transformer 1817. It also selects the navigational computer's longitude fine data from differential transformer 1818 or differential transformer 1826. Coarse micro-map output 1819 and fine micro-map output 1820 from longitude sector relay 1816 are then fed to control transformers in the longitude servo system. The rotor of the coarse differential transformer 1817 and the fine differential transformer 1818 are manually set by their respective control knobs 1831 and 1832. This setting provides an adjustable amount of offset required for good automatic alignment when transferring from the northern to the southern sector of the micro-map.

Differential transformer 1826 in series with the fine longitude input from the navigational computer is manually positioned by control knob through a fifteen-to-one gear reduction coupling 1828, in order to make minor corrections to the displayed position within limits of ±15 minutes of longitude.

The latitude sector relay 1821 selects the northern or southern sector latitude reference voltages derived from variable resistors 1822, 1823, 1824, and 1825, as required. The sector cam 1620 closes the sector switch 1621 to energize the longitude and latitude sector relays 1816 and 1821, respectively.

Latitude servo coordinate transfer, as previously mentioned, is accomplished by selecting new reference voltages to be applied to the latitude servo via feedback reference lines 1829 and 1830. Sector switch 1621 is normally adjusted for one-half degree of latitude overlap to prevent repeated switching from one sector to the other if the aircraft should be flying nearly east/west through the transfer region.

Figure 19:
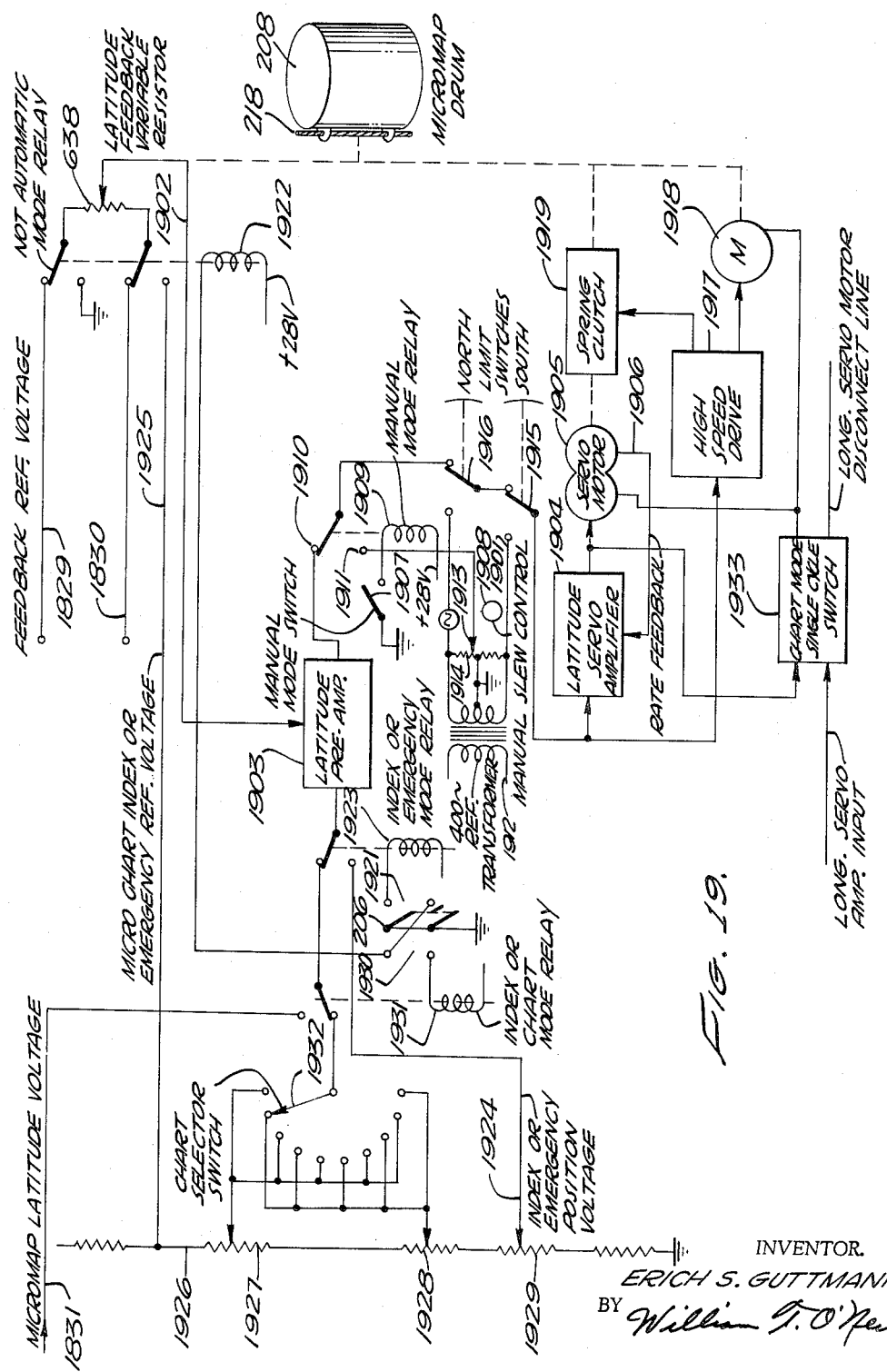
FIGURE 19 is the electrical diagram of latitude drive servo.

Referring to FIGURE 19, the latitude servo system is shown in schematic form. The latitude servo system rotates the precision lead screw latitude drive 218 to move the micro-map drum 208 forward or backward, providing an up or down motion of the projected image.

The basic latitude servo system compares the D.-C. voltage on the micro-map latitude line 1831, derived from the latitude conversion servo system, shown in FIGURE 18, with a D.-C. voltage from the arm 1902 of position feedback variable resistor 638. The difference, or error, voltage between the two is detected and modulated by a 400-cycle chopper in the latitude preamplifier 1903. The error signal is amplified by the latitude servo amplifier 1904 and the servo motor 1001 drives the map drum 208 and the arm of the feedback variable resistor 638 until the error is reduced to a minimum. Rate feedback 1906 is employed within the servo system for motor damping and smooth tracking at low speeds.

Access to the variety of data contained on the map drum 208, such as the index of contents, emergency procedures, instrument letdown procedures and operating procedures, requires that input signals and reference voltages, or the lack of them, must be selected as a function of the previously discussed five modes of operation.

Continuing, refer to FIGURE 19 and reference back to FIGURE 18. In the automatic mode, while computed position data is being displayed, no relays are energized. The input to the latitude preamplifier 1903 is the micromap latitude voltage 1831 from the non-linear latitude variable resistor 1602, shown in FIGURE 18. Feed-back reference voltages (lines 1829 and 1830) fed to the latitude feedback variable resistor 638, are supplied from among the latitude reference variable resistors 1822, 1823, 1824, and 1825, selected by the latitude sector relay 1821, all of which are also shown in FIGURE 18.

Referring now only to FIGURE 19, it will be noted that the manual mode is initiated when the north-south manual mode switch 1907 is closed and the manual slewing control 1908 is rotated. The manual mode relay 1909 opens the servo positioning loop at relay contact 1910 and connects the input of the servo amplifier 1904 through relay contact 1911 to the vertical rate signal derived from the A.C. reference transformer 1912. North-south slewing is then controlled by manual control 1908 which positions the movable tap 1913 on the variable resistor 1914. If the map drum 208 is driven to the extreme forward position, the south limit switch 1915 applies a reversing drive reference signal 1901 to the servo amplifier 1904 until the map drum 208 is driven away from the limit. If the original input remains unchanged, the map drum will be driven back to the limit once more, and the cycle will repeat until the input signal is removed by opening the manual mode switch 1907, or reversed by changing the position of the manual slewing control 1908, thereby changing the voltage reference input to the latitude servo amplifier 1904. The north limit switch 1916 operates in the same manner.

If the input signal to the servo amplifier 1904 is large, and the speed of servo motor 1905 can increase no further, the high-speed drive 1917 applies a proportional drive signal to the D.-C. slewing motor 1918. At the same time, the spring clutch 1919 in the servo motor gear train is electrically disengaged. This two-speed capability gives the latitude servo the dynamic range required by the variety of operating modes.

The emergency mode is initiated when the mode switch 206 (a double pole double throw switch with a neutral position) is set to the emergency position 1921. The non-automatic relay 1922 and the index-or-emergency mode relay 1923 are energized. This applies the index-or-emergency position voltage 1924 to the input of the latitude preamplifier 1903 along with the micro-chart index and emergency reference voltage 1925. This new voltage source is derived from voltage divider network 1926 which is so divided that the map drum is automatically positioned in latitude for displaying the emergency procedures. Inputs may be varied to compensate for differences in micro-chart strips by means of trimmer variable resistors 1927, 1928, and 1929.

In the chart mode, initiated when mode switch 206 is set to chart position 1930, the non-automatic relay 1922 and the index-or-chart mode relay 1931 are energized and the index or emergency mode relay 1923 is deenergized. The input to the latitude preamplifier 1903 is then determined by the position of the chart selector switch 1932.

When the latitude and longitude servos have positioned the map drum 208 at the selected micro-chart, the chart mode single-cycle switch 1933 detects the minimum position error and disables servo motor 1905 and high speed drive motor 1918. Thus the chart under observation remains in a firm position, being unaffected by any small fluctuation in voltage which would otherwise cause noticeable movement of the chart. When the chart selector switch 1932 is reset, the single cycle switch 1933 automatically resets and allows servo motor 1905 and high speed motor 1918 to obtain the new selected position. When the new position is obtained (minimum error) the single switch will again disable servo motor 1905 and high speed drive motor 1918.

Referring now to FIGURE 20, the longitude servo system will be seen in schematic form. The longitude servo system rotates the map drum 208 clockwise or counterclockwise, producing a left or right motion of the projected image in response to the longitude signals 628 and 629. As in the latitude servo system, operation of the longitude servo system varies widely from mode to mode.

In the automatic mode as previously discussed, position data consists of the direct or offset synchro inputs selected by the longitude section relay 1816 shown in FIGURE 18. Coarse longitude has a scale factor of one (1) degree of shaft displacement for one (1) degree of longitude. Fine longitude data has a scale factor of one (1) degree of shaft displacement for $\frac{1}{25}$ degree of longitude provided for by the 25-to-1 reduction gear drive 2001.

The coarse-fine selector 2002 is a level-sensitive switching circuit that connects the fine longitude error signal from the fine control transformer 2003 to the input of the longitude servo amplifier 2004 when the coarse longitude error signal from the coarse control transformer 2005 is small. A scale correction signal provided by the longitude feedback variable resistor 2006 is summed with the fine error signal in coarse-fine selector 2002 to compensate for dimensional variations between the micro-maps and the longitude servo positioning mechanism. When the longitude position error is large, the coarse-fine selector 2002 connects the coarse control transformer 2005 to the input of the servo amplifier 2004. At this time, the magnetic gearshift 2007 is energized via high speed enable line 2008, coupling a high-speed (low-ratio) gear train within the magnetic gearshift 2007 to the longitude servo drive 2009. As the longitude position error drops to a minimum, the magnetic gearshift 2007 automatically shifts back to the low-speed (high-ratio) gear train, and the input signal to the longitude servo amplifier 2004 is switched by the coarse-fine selector 2002 to the compensated fine longitude error. Rate feedback 2010 is incorporated in servo amplifier 2004 for smooth tracking at low speeds and for linear speed response of servo motor 2011 with respect to the input signal.

As the other various modes of operation are discussed, it should be noted that the relays shown in FIGURE 20 carrying a 1900 series number are also employed in the latitude servo system shown in FIGURE 19. Each relay employed is of the multi-contact type (some contacts for latitude and some for longitude) and is common to both the latitude and longitude servo system. Therefore, the switches used to energize or deenergize the various relays are also common to the functions of both the latitude and longitude servo system and will also be shown in FIGURE 20, but will carry the 1900 series number. As an example, manual mode relay 1909 shown in FIGURE 19 also appears in FIGURE 20 as manual mode relay 1909, however, a different set of contacts within the said relay is being used. Of course, if desired, individual relays can be used in the latitude and longitude servo systems as a matter of design choice.

The manual mode is initiated when the manual mode switch 1907 is closed and slewing control knob 2013 is turned. The manual mode relay 1909 opens the servo positioning loop at relay contact 2014 and connects the input of the servo amplifier 2004 through relay contact 2015 to the reference signal derived from the reference transformer 1912, shown in FIGURE 19. East-west slewing is then controlled by manual control knob 2013 which positions the movable tap on the variable resistor 2016. If the map drum 208 is driven to its extreme clockwise position, the east limit switch 2014 applies a reversing drive reference signal 2018 to servo amplifier 2004 until map drum 208 is driven away from the limit. If the original input remains unchanged, the map drum will be driven back to the limit once more and the cycle will repeat until the input signal is removed by opening the manual mode switch 1907 or reverse by changing the position of the manual control knob 2013 which changes the voltage reference input to the longitude servo amplifier 1204. The west limit switch 2019 operates in the same manner, applying reference signal 2020 opposite in phase to that of reference signal 2018, to servo amplifier 2004. All these reference signals are derived from the reference transformer 1912, shown in FIGURE 19.

In the emergency, index, or chart modes, the longitude servo system compares an input D.-C. voltage 2031 with a D.-C. voltage 2022 from the arm 2023 of a position feedback variable resistor 2024. The difference, or error voltage, between the two is detected and modulated by a 400-cycle chopper in the longitude preamplifier 2025. This error signal is amplified by servo amplifier 2004, the output of which drives the servo motor 2011, which in turn drives the map drum 208 and the arm 2023 of the feedback variable resistor 2024 until the error is reduced to a minimum.

Emergency procedure check lists and terminal chart index lists are repeated five times along the micro-chart strip within the area 805 (shown in FIGURE 8) on map drum 208, so a repetitive feedback voltage on the index or emergency position feedback line 2026 is necessary for both the emergency and index modes. This feedback is provided by a single-turn, continuously variable resistor (no stops) 2024, whose variable tap 2023 is geared to rotate five times for one drum revolution by means of 1 to 5 gear drive 2027.

In the emergency or index mode, initiated when the mode switch 1920 (also shown in FIGURE 19) is set to the emergency index position 1921, the non-automatic mode relay 1922 and the index or emergency mode relay 1923 are energized. The longitude preamplifier 2025 through input 2031 receives the emergency position signal derived from the chart index or emergency positioning variable resistor 2029 which is a part of the voltage divider network 2030. The position feedback signal is the index or emergency feedback 2026 from the rapid-access feedback variable resistor 2024 under these conditions. The chart indx or emergency procedures are displayed by manual rotation of the emergency or chart index positioning variable resistor 2029. Of course, positioning of the chart index and index to the emergency procedures can be made automatic by voltage selection at voltage divider network 2030. The emergency procedures can then be manually set by using the manual slew control 2013. Of course, this would necessitate energizing the manual mode relay 1909.

In the chart mode, initiated by setting the mode switch 1920 to the chart position 1930, only the non-automatic mode relay 1922 is energized. Micro-chart position inputs to the longtiude preamplifier 2025 are provided by the two rotary selector switches 2028 and 2032. The 10-position selector switch 2028, whose position is determined by the micro-chart code index, acts as a reference voltage range selector for the 17-position selector switch 2032. The chart position feedback signal is provided by the feedback variable resistor 2006.

As previously discussed, when the positon and heading information from the navigational computer is being displayed, the reticle image is projected on the screen. However, when the micro-chart data or emergency procedures are being displayed, the reticle image must be swung out of view, and the ×30 lens must be swung into the optical system. This is accomplished by grounding the lens and reticle actuator line 2033 when mode switch 2030 is in the emergency-index position 1921 or the chart position 1930.

Referring now to FIGURE 21, the lens and reticle actuators are depicted. The lens and reticle actuator line 2033, also shown in FIGURE 20, completes the plus 28-volt return path via the solenoid of "reticle-out" relay 2101 when the mode switch is either in the emergency-index position or chart position. The "reticle-out" relay 2101 when energized, applies 28 volts to the reticle drive motor 1110, driving reticle 207 to the "reticle-out" limit switch 1114, thus opening the "reticle-out" ground return 2103. The reticle 207 then remains in this position until the mode switch is set to the automatic position. When in the automatic position, the lens and reticle actuator line is opened, deenergizing the "reticle-out" relay 2101. This action closes the ground return and at the same time, reverses the polarity of the input voltage to the reticle drive motor 1110. The reticle 207 is then driven to the "reticle-in" limit switch 1115. The "reticle-in" ground return 2104 to the drive motor 1110 opens and the reticle 207 remains in this position until the action is reversed by resetting the mode switch.

The lens turret 1201 operates in the same manner as the reticle turret 1101 with the magnification selector switch 2105 in the ×10 position. With the mode in the chart or index-emergency mode position, the magnification relay 2106 is energized. The ×10 lens 1204 is then mechanically driven by the lens drive motor 1301 to the ×10 limit switch 1302. Setting the mode switch to the automatic position, disconnect the ground return to the solenoid of the magnification relay 2106. Thus, the polarity to the drive motor 1301 is reversed and the ×30 lens 304 is driven to the ×30 limit switch 1303. Either lens can be placed into the optical system without regard to the position of the mode switch by the magnification selector switch 2105.

From the foregoing it should readily be appreciated that the present invention provides a relatively simple, compact, and flexible pictorial display which can pinpoint aircraft or space-craft position on enroute maps, as well as display other pertinent information for the pilot's relief and benefit. Moreover, notwithstanding the instrument's relative simplicity and small size, storage capacity, and other features described, are well beyond those available in systems of prior art. While the invention has been illustrated by way of specific mechanisms and circuits, it is to be understood that the drawings and description are representative only and are not intended to limit the scope of the invention. Various modifications falling within the spirit will suggest themselves to those skilled in the art, and accordingly, in keeping with the nature and breadth of the invention.

What is claimed is:

1. A vehicle borne instrument for continuous presentation of a film recorded geographic environment and other data in accordance with travel of said vehicle, comprising the combination of: a translucent, rear-illuminated projection screen; film holding and transport means adapted to hold and form said film substantially into a cylindrical shape thereby to form a cylindrical surface of film, said film holding and transport means being also adapted to independently rotate and translate axially said cylindrical surface; illuminating means situated outside of and at a predetermined location with respect to the surface of said cylindrical drum, said illuminating means being adapted to pass light through a predetermined area of said film; an optical projection system located substantially inside said cylindrical surface in a manner so as to accept said light passed through said film and thereafter project said light through the interior of said cylindrical surface onto the back of said screen; first servo means responsive to a first input signal for effecting rotation of said cylindrical surface in accordance with a characteristic of said first input signal; and second servo means responsive to a second input signal for effecting axial translation of said cylindrical surface in accordance with a characteristic of said second input signal.

2. The invention set forth in claim 1 wherein said rotation of said cylindrical surface and said first input signal correspond to geographic latitude, and said axial translation and said second input signal correspond to geographic longitude.

3. In an instrument for continuous display of a portion of a mapped area, including substantially permanent data and relatively temporary data, said system having a rear illuminated projection screen, a source of illumination adapted to pass light through a portion of an at least partially translucent map medium, and an optical system for projecting said light thereby passed through said map portion onto said screen, the combination comprising: a first map comprising a translucent sheet with relatively opaque map data thereon; means including a rotatable mounting ring for holding said first map substantially in the shape of a first cylindrical surface; a second map comprising a second translucent sheet with relatively opaque map data thereon, said second map being sufficiently resilient to form a second cylindrical surface in close frictional contact with said first cylindrical surface when placed within said first cylindrical surface; and means responsive to first and second navigational signals for causing said mounting ring and therefore said first and second maps to rotate in response to said first navigational signal and to translate axially in response to said second navigational signal, thereby to present said relatively temporary data from said second map superimposed upon said relatively permanent data from said first map.

4. The invention set forth in claim 3 further defined in that said first and second maps comprise a resilient base material such as used for photographic film with said relatively permanent data emplaced on the inside of said first cylindrical surface and said relatively temporary data emplaced on the outside of said second cylindrical surface, thereby to place all of said data in substantially the same focal plane.

5. The invention set forth in claim 3 further defined in that said first and second maps comprise photographic films with their emulsion sides together, thereby to place all of said data in substantially the same focal plane.

6. The invention set forth in claim 3 further defined in that said first and second maps each include means for indexing with respect to said mounting ring thereby to insure correct mutual alignment of said permanent and temporary data and correct alignment with respect to said navigational signals.

7. A compact vehicle borne instrument for geographic situation display comprising: a replaceable positive photographic film of substantially rectangular shape constituting a two coordinate map of an area of interest; film holding and traverse means adapted to hold said photographic film in the shape of a cylindrical surface; a projection screen adapted to rear illumination mounted adjacent to one open end of said cylindrical surface with the plane of said screen substantially normal to the axis of said cylindrical surface; and optical means including a source of light directed through said film at a predetermined location outside the periphery of said cylindrical surface and a folded lens system at least partly within said cylindrical surface for conveying said light, after passage through said film, around a plurality of bends and projecting an image axially through the interior of said cylindrical surface onto said screen.

8. In a compact vehicle borne optical projector for display of navigational and other data, the combination comprising: a partially opaque and partially transparent flexible surface containing said navigational and other data; holding and transport means for supporting said film and forming it into a cylindrical surface, said holding and transport means being adapted to allow rotational motion and axial translational motion of said cylindrical surface; drive means coupled to said holding and transport means for effecting said rotational and translational motions in response to control signals; a light source located at a predetermined fixed location about the outer periphery of said cylindrical surface and oriented to pass light through said cylindrical surface; a viewing screen mounted normal to the axis of said cylindrical surface and at one end thereof; and a projection lens system located substantially within the spatial cylinder defined by the limits of said axial translational motion of said cylindrical surface, said projection lens system being folded and directed to receive said light passed through said cylindrical surface and project said light to illuminate said screen.

9. The invention set forth in claim 8 further defined in that said projection lens system includes means to effect a plurality of light bends and at least one cross-over of light within said lens system in the vicinity of the axis of said cylindrical surface radially from the said location of said light source, thereby to afford a long optical path and correspondingly long image-object distance without an increase in the overall size of said projector.

10. The invention set forth in claim 8 further defined in that said screen is located parallel to and near the plane of the front panel of said projector, and said light source is mounted through said front panel in a removable cartridge assembly, said cartridge assembly holding said light source at said predetermined fixed position.

11. An instrument for continuous display, in accordance with travel of a vehicle, of map data from a portion of an area mapped according to Mercator projection on film, comprising: a translucent rear-illuminated projection screen; film mounting means including a drive ring assembly adapted to hold said film in the form of a substantially cylindrical surface supported at one end by said ring assembly; a light source disposed outside said cylindrical surface for illuminating a portion of said film surface; a lens system arranged to detect light passing from said light source through said cylindrical surface and to project said light onto said projection screen; longitude drive means responsive to a longitude control signal for rotating said cylindrical surface in accordance with said longitude control signal; latitude drive means responsive to a modified latitude control signal to cause axial translational motion of said cylindrical surface in accordance with said latitude control signal; and latitude conversion means responsive to a latitude control signal and disposed between a source of latitude control signal and said latitude drive means to generate and apply said modified latitude control signal to said latitude drive means, said latitude conversion means comprising a servo-mechanism responsive to said latitude control signal and a continuously variable non-linear voltage divider connected to be mechanically driven by said servo-mechanism, thereby to generate said modified latitude control signal.

References Cited by the Examiner

UNITED STATES PATENTS

| 1,320,760 | 11/19 | Ives | 88—24 |
| 2,501,453 | 3/50 | Rowe et al. | 88—24 |
| 2,512,256 | 6/50 | O'Connor | 88—24 |
| 2,608,094 | 8/52 | Best | 88—24 |
| 2,820,404 | 1/58 | Chung Shu Kwei | 88—24 |
| 2,836,816 | 5/58 | Allison et al. | 88—1 |

OTHER REFERENCES

Advanced Aircraft Instrumentation, Pictorial Navigation Displays, published by Hughes Aircraft Company (4–60/EL/3M). (15 pages.) (Especially 2–9 inclusive.)

NORTON ANSHER, *Primary Examiner.*

EMIL G. ANDERSON, *Examiner.*